US012494169B2

(12) United States Patent
Noh et al.

(10) Patent No.: US 12,494,169 B2
(45) Date of Patent: Dec. 9, 2025

(54) PIXEL CIRCUIT AND DISPLAY APPARATUS COMPRISING THE SAME

(71) Applicant: LG Display Co., Ltd., Seoul (KR)

(72) Inventors: Junhwan Noh, Seoul (KR); HyunKyo Lim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/421,730

(22) Filed: Jan. 24, 2024

(65) Prior Publication Data

US 2024/0257739 A1 Aug. 1, 2024

(30) Foreign Application Priority Data

Jan. 31, 2023 (KR) ........................ 10-2023-0012976

(51) Int. Cl.

*G09G 3/32* (2016.01)
*G09G 3/3233* (2016.01)
*G09G 3/3266* (2016.01)

(52) U.S. Cl.

CPC ......... *G09G 3/3233* (2013.01); *G09G 3/3266* (2013.01); *G09G 2300/0819* (2013.01); *G09G 2300/0842* (2013.01); *G09G 2320/0233* (2013.01); *G09G 2320/0247* (2013.01); *G09G 2330/02* (2013.01); *G09G 2340/0435* (2013.01)

(58) Field of Classification Search

CPC ............... G09G 3/3233; G09G 3/3266; G09G 2300/0819; G09G 2300/0842; G09G 2320/0233; G09G 2320/0247; G09G 2330/02; G09G 2340/0435; G09G 3/32; G09G 2320/02; G09G 3/3275; G09G 2300/0426; G09G 2300/0809; G09G 2310/08

See application file for complete search history.

(56) References Cited

U.S. PATENT DOCUMENTS

2021/0056908 A1* 2/2021 Park ..................... G09G 3/3275
2023/0154411 A1* 5/2023 Lee ..................... G06V 40/1306 345/204
2023/0335056 A1* 10/2023 Cho ..................... G09G 3/3266

* cited by examiner

*Primary Examiner* — Towfiq Elahi
(74) *Attorney, Agent, or Firm* — Fenwick & West LLP

(57) ABSTRACT

The pixel circuit and a display apparatus including the same are disclosed. A supply frequency of a fourth scan signal which is supplied to the pixel may be controlled, in response to a frame frequency (or a supply frequency of a second scan signal) of the display apparatus. The pixel circuit and the display apparatus including the same may be driven at various frame frequencies and suppress the mura phenomenon which may be visible to the user.

21 Claims, 20 Drawing Sheets

PIXEL CIRCUIT AND DISPLAY APPARATUS COMPRISING THE SAME

CROSS-REFERENCE TO RELATED APPLICATION

This application claims the priority of Republic of Korea Patent Application No. 10-2023-0012976 filed on Jan. 31, 2023, in the Korean Intellectual Property Office, which is hereby incorporated by reference in its entirety.

BACKGROUND

Field

The present disclosure relates to a pixel circuit and a display apparatus including the same.

Description of the Related Art

As it enters an information era, a display field which visually expresses electrical information signals has been rapidly developed, and in response to this, various display apparatus having excellent performances such as thin-thickness, light weight, and low power consumption have been developed. Examples of such a display device include a liquid crystal display (LCD) device, an organic light emitting display (OLED) device, and the like.

Such a display apparatus may include a display panel in which pixels for displaying images are disposed and a driving circuit. The driving circuit includes a data driver which supplies a data signal to the pixels through data lines, a gate driver which supplies a gate signal to the pixels through gate lines, a timing controller which controls the data driver and the gate driver, and the like.

SUMMARY

An object to be achieved by the present disclosure is to provide a pixel circuit which improves a mura phenomenon and a display apparatus including the same.

Another object to be achieved by the present disclosure is to provide a pixel circuit which is driven at various frame frequencies and a display apparatus including the same.

Objects of the present disclosure are not limited to the above-mentioned objects, and other objects, which are not mentioned above, can be clearly understood by those skilled in the art from the following descriptions.

A pixel circuit according to an exemplary embodiment of the present disclosure includes a light emitting diode, a first transistor which is connected between a first node and a third node and controls a driving current flowing from a first power line which supplies a first power voltage to a second power line which supplies a second power voltage through the light emitting diode, a second transistor which is connected between the third node and a second node corresponding to a gate electrode of the first transistor and is turned on in response to a first scan signal supplied to a first scan line, a third transistor which is connected between a data line and the first node and is turned on in response to a second scan signal supplied to a second scan line, a fourth transistor which is connected between the second node and a third power line which supplies a third power voltage and is turned on in response to a third scan signal supplied to a third scan line, a fifth transistor which is connected between the first power line and the first node and is turned off in response to an emission control signal supplied to an emission control line, a sixth transistor which is connected between the third node and a fourth node corresponding to a first electrode of the light emitting diode and is turned off in response to the emission control signal, and a seventh transistor which is connected between the fourth node and a fourth power line which supplies a fourth power voltage and is turned on in response to a fourth scan signal supplied to a fourth scan line, wherein a supply frequency of the fourth scan signal is determined in response to a supply frequency of the second scan signal.

A display apparatus according to an exemplary embodiment of the present disclosure includes pixels each of which is connected to first to fourth scan lines, an emission control line, a data line, and first to fifth power lines to which first to fifth power voltages are supplied, a scan driver which supplies first to fourth scan signals to the first to fourth scan lines, respectively, an emission driver which supplies an emission control signal to the emission control line and a data driver which supplies a data signal to the data line, wherein each of the pixel includes a light emitting diode, a first transistor which is connected between a first node and a third node and controls a driving current flowing from the first power line to the second power line through the light emitting diode, a second transistor which is connected between the third node and a second node corresponding to a gate electrode of the first transistor and is turned on in response to the first scan signal, a third transistor which is connected between the data line and the first node and is turned on in response to the second scan signal, a fourth transistor which is connected between the second node and the third power line and is turned on in response to the third scan signal, a fifth transistor which is connected between the first power line and the first node and is turned off in response to the emission control signal, a sixth transistor which is connected between the third node and a fourth node corresponding to a first electrode of the light emitting diode and is turned off in response to the emission control signal, and a seventh transistor which is connected between the fourth node and the fourth power line and is turned on in response to the fourth scan signal, and wherein the scan driver determines a supply frequency of the fourth scan signal in response to a frame frequency or a supply frequency of the second scan signal of the display apparatus.

Other detailed matters of the exemplary embodiments are included in the detailed description and the drawings.

In the pixel circuit according to exemplary embodiments of the present disclosure and the display apparatus including the same, a supply frequency of a fourth scan signal which is supplied to each of the pixels may be controlled, in response to a frame frequency (or a supply frequency of the second scan signal) of the display apparatus. For example, in a first mode in which the frame frequency (or a supply frequency of the second scan signal) of the display apparatus is equal to or lower than a reference frequency, the supply frequency of the fourth scan signal is maintained at a maximum frequency regardless of a frame period. In a second mode in which the frame frequency (or the supply frequency of the second scan signal) of the display apparatus exceeds the reference frequency, the supply frequency of the fourth scan signal may vary in every frame period. Accordingly, the pixel circuit according to the exemplary embodiments of the present disclosure and the display apparatus including the same may be driven at various frame frequencies and suppress the mura phenomenon which may be visible to the user.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
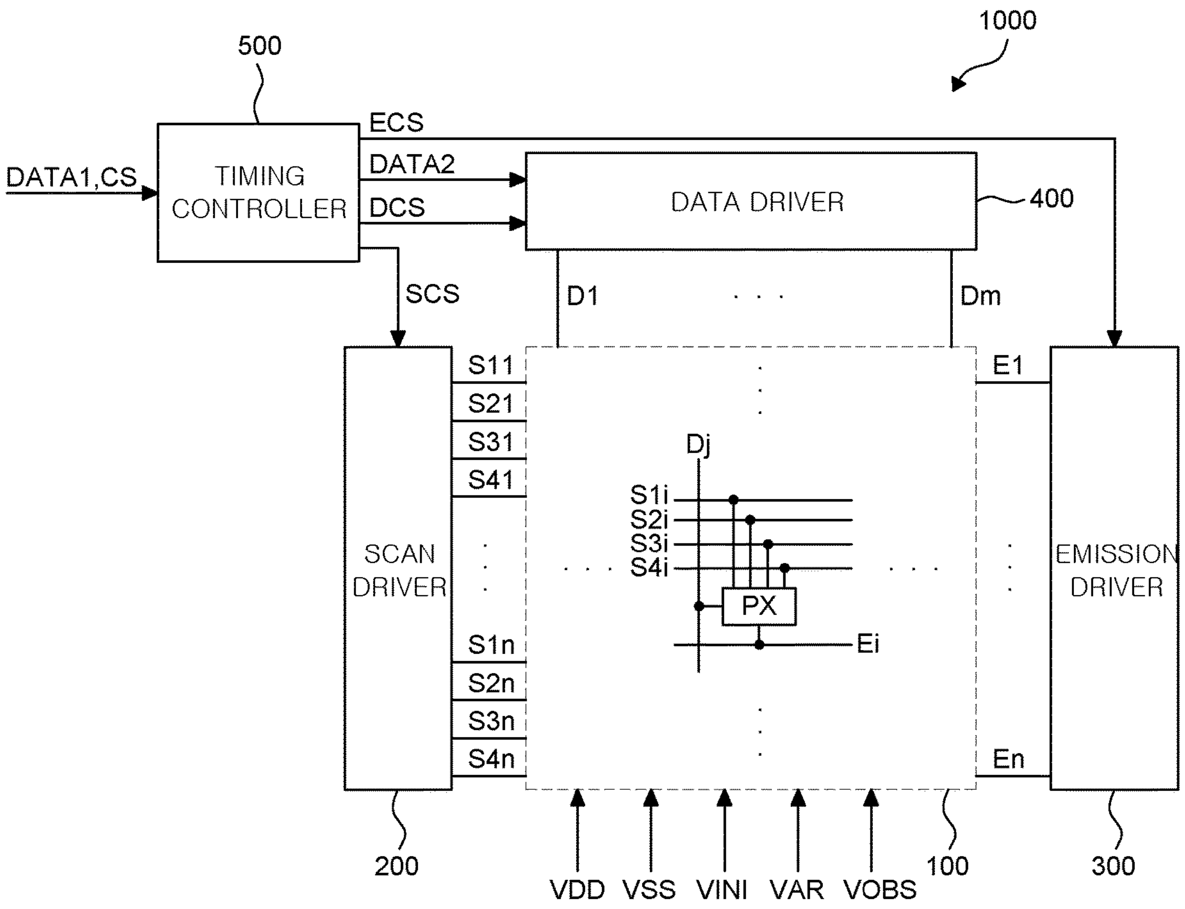
FIG. 1 is a block diagram illustrating a display apparatus according to exemplary embodiments of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, an additional layer or element may be interposed directly on the other element or layer or therebetween.

Although the terms "first", "second", and the like are used for describing various components, these components are not confined by these terms. These terms are merely used for distinguishing one component from other components. Therefore, a first component to be mentioned below may be a second component in a technical concept of the present disclosure.

Like reference numerals generally denote like elements throughout the specification.

A size and a thickness of each component illustrated in the drawings are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, different embodiments of the present disclosure will be described in detail with reference to the attached drawings.

FIG. 1 is a block diagram illustrating a display apparatus according to exemplary embodiments of the present disclosure.

Referring to FIG. 1, a display apparatus 1000 according to exemplary embodiments of the present disclosure may include a pixel unit 100 (or a display panel), a scan driver 200, an emission driver 300, a data driver 400, and a timing controller 500.

The display apparatus 1000 may display images at various frame frequencies (a refresh rate, a driving frequency, or a frame rate) depending on a driving condition. The frame frequency is a frequency at which a data voltage is actually written in a driving transistor of a pixel PX for one second.

For example, the frame frequency is also referred to as a screen scan rate or a screen refresh rate and indicates a frequency at which the display screen is refreshed for one second.

In one exemplary embodiment, an output frequency of a scan signal (for example, a second scan signal) which is supplied to a scan line (for example, a second scan line) to supply a data signal output frequency and/or a data signal of the data driver 400 may be changed in response to the frame frequency. For example, when the frame frequency is 120 Hz, the second scan signal may be supplied to each horizontal line (a pixel row) 120 times per second.

In one exemplary embodiment, the display apparatus 1000 may adjust an output frequency of the scan driver 200 and the emission driver 300 and an output frequency of the data driver 400 corresponding thereto in accordance with the driving condition. For example, the display apparatus 1000 may display images in accordance with various frame frequencies of 1 Hz to 120 Hz. Here, the frame frequency may be set by a divisor of a maximum frequency excluding the maximum frequency based on the maximum frequency at which the scan signal is supplied. For example, the scan signal may be supplied at a maximum of 240 Hz, and accordingly, the display apparatus 1000 may display images at frame frequencies corresponding to divisors of 240 Hz, excluding 240 Hz.

However, this is illustrative and the display apparatus 1000 may display images also at a frame frequency of 120 Hz or higher (for example, 240 Hz or 480 Hz).

In the meantime, the display apparatus 1000 may operate at various frame frequencies. In the case of the low-frequency driving, image defects such as flicker may be visible due to the current leakage in the pixel. Further, after-images such as image drag may be visible due to a bias state change of the driving transistor due to the driving at various frame frequencies or a change in the response speed due to a threshold voltage shift caused by changes in hysteresis characteristic.

In order to improve an image quality, one frame period may include a plurality of non-emission periods and emission periods according to the frame frequency. For example, a first non-emission period and emission period of one frame may be defined as a first driving period and subsequent non-emission period and emission period may be defined as a second driving period (or a third driving period).

For example, in the first driving period, a data signal for substantially displaying images is written in the pixel PX in the first driving period, and an on-bias may be applied to the driving transistor of the pixel PX in the second driving period (or the third driving period).

The pixel unit 100 may include scan lines S11 to S1$n$, S21 to S2$n$, S31 to S3$n$, and S41 to S4$n$, emission control lines E1 to En, and data lines D1 to Dm and include pixels PX connected to the scan lines S11 to S1$n$, S21 to S2$n$, S31 to S3$n$, and S41 to S4$n$, the emission control lines E1 to En, and the data lines D1 to Dm (provided n and m are integers larger than 1). Each pixel PX may include a driving transistor and a plurality of switching transistors. The pixels PX may be supplied with a first power voltage VDD, a second power voltage VSS, a third power voltage VINI (for example, a first initialization voltage), a fourth power voltage VAR (for example, a second initialization voltage), and a fifth power voltage VOBS (for example, a bias voltage).

A voltage level of the second power voltage VSS may be less than a voltage level of the first power voltage VDD. For example, the first power voltage VDD may be a positive voltage and the second power voltage VSS may be a negative voltage.

The third power voltage VINI (for example, first initialization voltage) and the fourth power voltage VAR (for example, second initialization voltage) are initialization voltages which initialize the pixel PX and for example, the driving transistor and/or the light emitting diode included in the pixel PX may be initialized by the initialization voltages.

The fifth power voltage VOBS (for example, bias voltage) may be a voltage for supplying a predetermined bias to a source electrode and/or a drain electrode of the driving transistor included in the pixel PX. For example, the fifth power voltage VOBS may be a positive voltage. However, a voltage level of the fifth power voltage VOBS is not limited thereto and the fifth power voltage VOBS may be set as a negative voltage.

In the exemplary embodiment of the present disclosure, signal lines connected to the pixel PX may be set in various forms in accordance with a circuit structure of the pixel PX.

The timing controller 500 may be supplied with a first data DATA1 (for example, input image data) and an input control signal CS from a host system, such as an application processor (AP), through a predetermined interface. The timing controller 500 may control driving timings of the scan driver 200, the emission driver 300, and the data driver 400.

The timing controller 500 may generate a first control signal SCS, a second control signal ECS, and a third control signal DCS based on the first data DATA1 and the input control signal CS. For example, the input control signal CS may include a vertical synchronization signal, a horizontal synchronization signal, a data enable signal, a clock signal, and the like. The first control signal SCS may be supplied to the scan driver 200, the second control signal ECS may be supplied to the emission driver 300, and the third control signal DCS may be supplied to the data driver 400. The timing controller 500 realigns the first data DATA1 to generate a second data DATA2 and supply the second data to the data driver 400.

The scan driver 200 may receive a first control signal SCS (for example, a scan control signal) from the timing controller 500. The scan driver 200 may supply a first scan signal, a second scan signal, a third scan signal, and a fourth scan signal to the first scan lines S11 to S1$n$, the second lines S21 to S2$n$, the third scan lines S31 to S3$n$, and the fourth scan lines S41 to S4$n$ based on the first control signal SCS, respectively.

The first to fourth scan signals may be set as a gate-on voltage (for example, a low voltage or a high voltage) corresponding to a type of a transistor to which the corresponding scan signals are supplied. The transistor which receives the scan signal may be set to a turn-on state when the scan signal is supplied. For example, a gate-on voltage of a scan signal supplied to a P-channel metal oxide semiconductor (PMOS) transistor may be a logic low level and a gate-on voltage of a scan signal supplied to an N-channel metal oxide semiconductor (NMOS) transistor may be a logic high level. Hereinafter, the meaning of "scan signal is supplied" is understood as the scan signal being supplied at a logic level which turns on the transistor which is controlled by the scan signal.

The emission driver 300 may supply an emission control signal to emission control lines E1 to En based on a second control signal ECS (for example, an emission driving control signal). For example, the emission control signal may be sequentially supplied to the emission control lines E1 to En.

The emission control signal may be set as a gate-off voltage (for example, a high voltage). A transistor which receives the emission control signal may be turned off when the emission control signal is supplied and may be set to a turn-on state in the other cases. Hereinafter, the meaning of "emission control signal is supplied" is understood as the emission control signal being supplied at a logic level which turns off the transistor which is controlled by the emission control signal.

In the meantime, for the convenience of description, in FIG. 1, it is illustrated that the scan driver 200 and the emission driver 300 are single configurations, respectively, but the present disclosure is not limited thereto. Depending on the design, the scan driver 200 may include a plurality of scan drivers each of which supplies at least one of the first to fourth scan signals, respectively. Further, at least some of the scan driver 200 and the emission driver 300 may be integrated as one driving circuit, module, or the like.

The data driver 400 may receive a third control signal DCS (for example, a data control signal) and a second data DATA2 (for example, image data) from the timing controller 500. The data driver 400 may convert a digital type of second data DATA2 into an analog data signal (for example, a data voltage). The data driver 400 may supply the analog data signal to the data lines D1 to Dm in response to the third control signal DCS. At this time, the analog data signal supplied to the data lines D1 to Dm may be supplied to be synchronized with the second scan signal supplied to the second scan lines S21 to S2*n*.

In one exemplary embodiment, the data driver 400 may supply active data to the data lines D1 to Dm or supply a parking voltage which is maintained at a constant voltage level, within one frame period. For example, one frame period may include an active period in which active data for displaying images is supplied to the data lines D1 to Dm and a vertical blank period in which the parking voltage is supplied to the data lines D1 to Dm. Here, when the parking voltage is supplied to the data lines D1 to Dm in the vertical blank period, the data lines D1 to Dm are maintained at a constant voltage level by the parking voltage, respectively, so that a size of a parasitic capacitor in the pixel PX is constantly maintained to suppress the lowering of the luminance of the display apparatus 1000. Therefore, the image quality may be improved.

In the meantime, a mura phenomenon may be generated in the image which is displayed by the display apparatus 1000, due to the parking voltage. For example, as described above, the parking voltage is supplied to the data lines D1 to Dm in the vertical blank period. Therefore, the voltage level of the data lines D1 to Dm may be sharply changed at a timing when an active period in one frame period is switched to the vertical blank period and/or a timing when the vertical blank period is switched to an active period of a next frame period. In this case, a voltage of a node (for example, a second node N2 or a fourth node N4 of FIG. 3) in the pixel PX varies by the coupling of the parasitic capacitor present in the pixel PX in accordance with the voltage level change of the data lines D1 to Dm to cause the mura phenomenon. At this time, in response to the vertical blank period, when the transistors included in the pixel PX are turned on, the mura phenomenon due to the coupling may become more severe.

In the meantime, when the frame frequency of the display apparatus 1000 is relatively low (for example, 60 Hz or lower), the vertical blank period included in one frame period is relatively long. Accordingly, an interval between a timing when the voltage of the data lines D1 to Dm is changed from the data voltage to the parking voltage and a timing when the parking voltage is changed to the data voltage may be relatively long. In this case, the interval between the timings when the above-mentioned mura phenomenon occurs is long, so that the mura phenomenon may not be visible to the actual user.

In contrast, when the frame frequency of the display apparatus 1000 is relatively high (for example, higher than 60 Hz), the vertical blank period included in one frame period is relatively short. Accordingly, an interval between a timing when the voltage of the data lines D1 to Dm is changed from the data voltage to the parking voltage and a timing when the parking voltage is changed to the data voltage may be relatively short. In this case, the above-described mura phenomenon occurs plurality of times within a relatively short time, so that the mura phenomenon is visible to an actual user to degrade the image quality.

In order to suppress the recognition of the mura phenomenon, in one exemplary embodiment, the scan driver 200 may determine a supply frequency of the fourth scan signal in response to the supply frequency of the second scan signal. For example, in a first mode in which the supply frequency of the second scan signal is equal to or lower than a reference frequency, the scan driver 200 may constantly maintain the supply frequency of the fourth scan signal at every frame period. In a second mode in which the supply frequency of the second scan signal exceeds the reference frequency, the scan driver 200 may vary the supply frequency of the fourth scan signal at every frame period.

Here, the reference frequency is a frequency at which the mura phenomenon is not visible and may be a predetermined value. For example, the reference frequency may be 60 Hz, but is just an example so that the exemplary embodiment of the present disclosure is not limited thereto.

To be more specific, in the first mode in which the display apparatus 1000 is driven at a frame frequency which is equal to or less than the reference frequency, the scan driver 200 may maintain the supply frequency of the fourth scan signal at every frame period to the above-described maximum frequency (for example, 240 Hz). For example, the scan driver 200 may maintain the supply frequency of the fourth scan signal at four times the reference frequency at every frame period. As described above, when the supply frequency of the fourth scan signal is maintained at the maximum frequency, the initialization voltage and/or the bias voltage in the pixel PX is supplied by the transistors which is turned on by supplying the fourth scan signal so that the panel refresh progresses to improve the image quality.

In contrast, in the second mode in which the display apparatus 1000 is driven at a frame frequency which exceeds (e.g., greater than) the reference frequency, the scan driver 200 may supply the fourth scan signal at the above-described maximum frequency (for example, 240 Hz) in one frame period (for example, a first frame period) and supply the fourth scan signal at the same frequency as the frame frequency of the display apparatus 1000 in the next frame period (for example, a second frame period). That is, the display apparatus 1000 may 1000 may set the supply frequency (or the frame frequency of the display apparatus 1000) of the second scan signal for writing the data signal and the supply frequency of the fourth scan signal to be the same in the second frame period of the second mode. As described above, in the second frame period, the fourth scan signal is supplied at the same frequency as the frame frequency of the display apparatus 1000, that is, a frequency lower than the maximum frequency so that the number of times of turn-on of the transistors included in the pixel PX is reduced. Accordingly, in the second frame period, the above-described mura phenomenon does not occur.

That is, the display apparatus 1000 according to the exemplary embodiments of the present disclosure performs the panel refresh by setting the supply frequency of the fourth scan signal to the maximum frequency in one frame period (for example, the first frame period) in the second mode in which the display apparatus is driven at the frame frequency which exceeds the reference frequency at which the mura phenomenon is visible. Further, in the next frame period (for example, the second frame period), the supply frequency of the fourth scan signal is set to the frame frequency of the display apparatus 1000 which is lower than the maximum frequency so that the mura phenomenon may be suppressed from being recognized by the user.

This will be described below in more detail with reference to FIG. 11.

Figure 2:
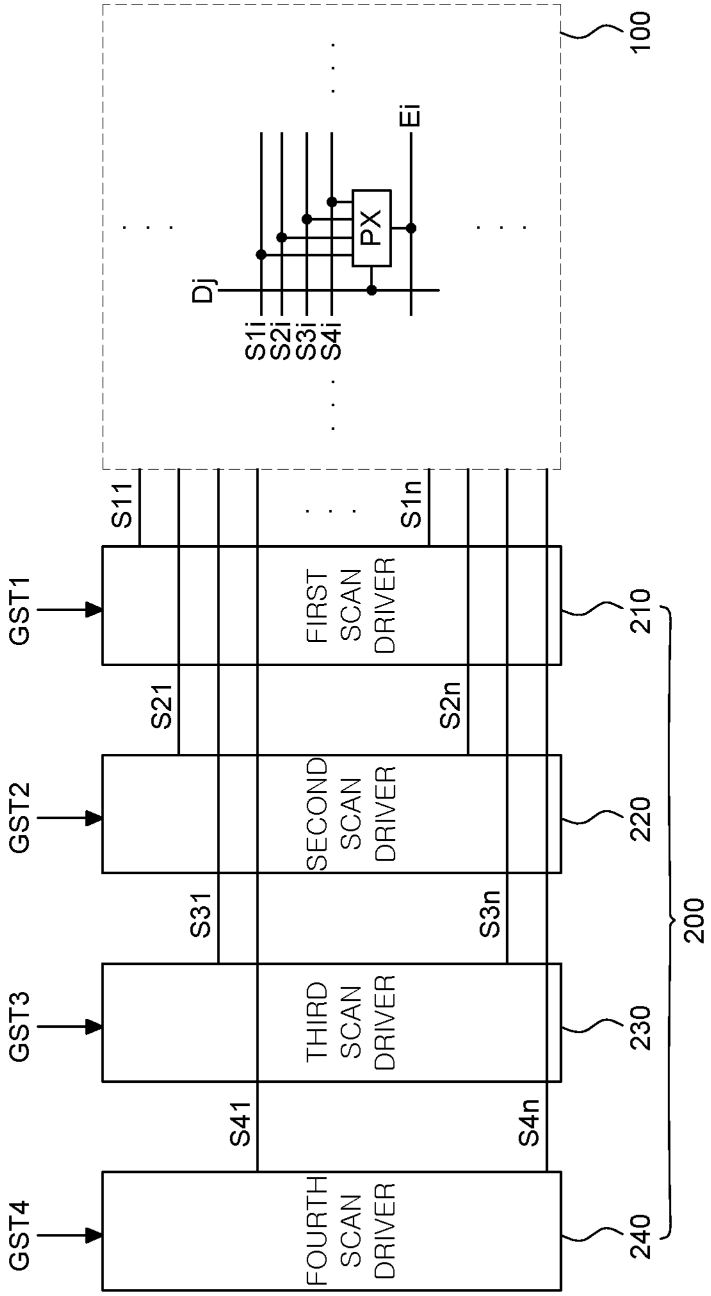
FIG. 2 is a view illustrating an example of a scan driver included in the display apparatus of FIG. 1 according to exemplary embodiments of the present disclosure.

FIG. 2 is a view illustrating an example of a scan driver included in the display apparatus of FIG. 1 according to one embodiment.

Referring to FIGS. 1 and 2, the scan driver 200 may include a first scan driver 210, a second scan driver 220, a third scan driver 230, and a fourth scan driver 240.

The first control signal SCS (for example, a scan control signal) may include first to fourth scan start signals GST1 to GST4. The first to fourth scan start signals GST1 to GST4 may be supplied to first to fourth scan drivers 210, 220, 230, and 240, respectively.

Widths, supply timings, and the like of the first to fourth scan start signals GST1 to GST4 may be determined according to a driving condition and a frame frequency of the pixel PX. The first to fourth scan signals may be output based on the first to fourth scan start signals GST1 to GST4, respectively. For example, a signal width of at least one of the first to fourth scan signals may be different from a signal width of the others.

The first scan driver 210 may sequentially supply the first scan signal to the first scan lines S11 to S1*n* in response to the first scan start signal GST1. The second scan driver 220 may sequentially supply the second scan signal to the second scan lines S21 to S2*n* in response to the second scan start signal GST2. The third scan driver 230 may sequentially supply the third scan signal to the third scan lines S31 to S3*n* in response to the third scan start signal GST3. The fourth scan driver 240 may sequentially supply the fourth scan signal to the fourth scan lines S41 to S4*n* in response to the fourth scan start signal GST4.

Figure 3:
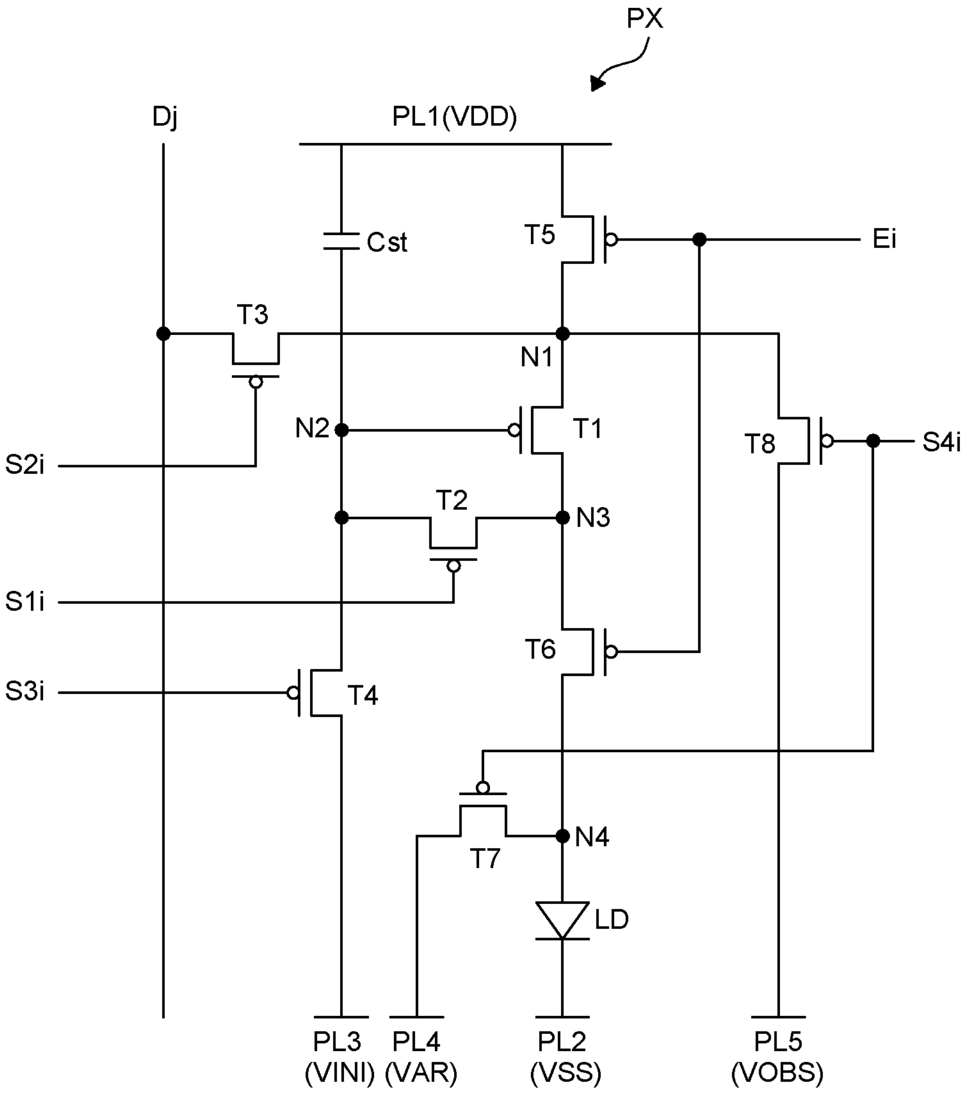
FIG. 3 is a circuit diagram illustrating an example of a pixel circuit included in the display apparatus of FIG. 1 according to exemplary embodiments of the present disclosure.

FIG. 3 is a circuit diagram illustrating an example of a pixel circuit included in the display apparatus of FIG. 1 according to one embodiment.

In FIG. 3, for the convenience of description, a pixel PX which is located in an i-th horizontal line (or an i-th pixel row) and is connected to a j-th data line Dj will be illustrated (provided i and j are integers larger than 0). In the meantime, the pixel PX illustrated in FIG. 3 may be substantially the same as the pixel PX which has been described with reference to FIG. 1.

Referring to FIGS. 1 and 3, the pixel PX may include a light emitting diode LD, first to eighth transistors T1 to T8, and a storage capacitor Cst.

A first electrode (for example, an anode electrode) of the light emitting diode LD may be connected to a fourth node N4 (or a second electrode of a sixth transistor T6) and a second electrode (for example, a cathode electrode) may be connected to a second power line PL2 which transmits a second power voltage VSS. The light emitting diode LD may generate light with a predetermined luminance in response to a current amount (driving current) supplied from the first transistor T1 (for example, a driving transistor).

The second power line PL2 is a line type, but is not limited thereto. For example, the second power line PL2 may be a conductive plate type of conductive layer.

In one exemplary embodiment, the light emitting diode LD may be an organic light emitting diode including an organic emission layer. In another exemplary embodiment, the light emitting diode LD may be an inorganic light emitting diode which is formed with an inorganic material, such as a micro light emitting diode (LED) or a quantum dot light emitting diode. In another exemplary embodiment, the light emitting diode LD may be a light emitting diode in which an organic material and an inorganic material are mixed.

Even though in FIG. 3, it is illustrated that the pixel PX includes a single light emitting diode LD, according to another exemplary embodiment, the pixel PX includes a plurality of light emitting diodes and the plurality of light emitting diodes may be connected in series, parallel, or serial-parallel. For example, in the pixel PX including a plurality of light emitting diodes, the plurality of light emitting diodes (for example, organic light emitting diodes and/or inorganic light emitting diodes) may be connected in series, parallel, or serial-parallel, between the second power line PL2 and the fourth node N4.

A first electrode (for example, a source electrode) of the first transistor T1 may be connected to the first node N1 and a second electrode (for example, a drain electrode) may be connected to the third node N3. A gate electrode of the first transistor T1 may be connected to the second node N2. The first transistor T1 may control a driving current (for example, a current amount of driving current) which flows from the first power line PL1 which supplies the first power voltage VDD to the second power line PL2 which supplies the second power voltage VSS via the light emitting diode LD in response to the voltage of the second node N2, that is, the voltage of the gate electrode of the first transistor T1. To this end, the first power voltage VDD may be set to be higher than the second power voltage VSS. For example, the first power voltage VDD may be a positive voltage and the second power voltage VSS may be a negative voltage.

The second transistor T2 may be connected between the second electrode (for example a third node N3) of the first transistor T1 and the gate electrode (for example, the second node N2) of the first transistor T1. For example, a first electrode (for example, a drain electrode) of the second transistor T2 may be connected to the third node N3 and a second electrode (for example, a source electrode) of the second transistor T2 may be connected to the second node N2. A gate electrode of the second transistor T2 may be connected to an i-th first scan line (S1*i*, hereinafter, a first scan line). When the first scan signal is supplied to the first scan line S1*i*, the second transistor T2 is turned on to electrically connect the second electrode of the first transistor T1 and the gate electrode of the first transistor T1 (for example, the second node N2 and the third node N3). That is, a timing of connecting the second electrode (for example, the drain electrode) of the first transistor T1 and the gate electrode of the first transistor T1 may be controlled by the first scan signal. When the second transistor T2 is turned on, the first transistor T1 may be connected in a diode form.

The third transistor T3 may be connected between a j-th data line (Dj, hereinafter, referred to as a data line) and the first node N1. For example, a first electrode (for example, a source electrode) of the third transistor T3 may be connected to the data line Dj and a second electrode (for example, a drain electrode) may be connected to the first node N1. A gate electrode of the third transistor T3 may be connected to an i-th second scan line (S2*i*, hereinafter, referred to as a second scan line). When the second scan signal is supplied to the second scan line S2*i*, the third transistor T3 is turned on to electrically connect the data line Dj and the first node N1.

The fourth transistor T4 may be connected between the second node N2 (for example, the gate electrode of the first transistor T1) and the third power line PL3 which supplies the third power voltage VINI (hereinafter, referred to as "first initialization voltage"). For example, a first electrode (for example, a drain electrode) of the fourth transistor T4 may be connected to the third power line PL3 and a second electrode (for example, a source electrode) may be connected to the second node N2. A gate electrode of the fourth transistor T4 may be connected to an i-th third scan line (S3*i*, hereinafter, referred to as a third scan line). When the third scan signal is supplied to the third scan line S3*i*, the fourth transistor T4 is turned on to supply the first initialization voltage VINI to the second node N2. Here, the first initialization voltage VINI may be set to be lower than a lowest level of the data signal which is supplied to the data line Dj.

The fourth transistor T4 is turned on by supplying the third scan signal to initialize a voltage of the gate electrode (or a second node N2) of the first transistor T1 to the first initialization voltage VINI.

The fifth transistor T5 may be connected between the first power line PL1 and the first node N1. For example, a first electrode (for example, a source electrode) of the fifth transistor T5 may be connected to the first power line PL1 and a second electrode (for example, a drain electrode) may be connected to the first node N1. A gate electrode of the fifth transistor T5 may be connected to an i-th emission control line (Ei, hereinafter, referred to as an emission control line). When the emission control signal is supplied to the emission control line Ei, the fifth transistor T5 may be turned off and in the other case, may be turned on. When the fifth transistor T5 is turned on, the first node N1 may be electrically connected to the first power line PL1.

The sixth transistor T6 may be connected between the second electrode (or a third node N3) of the first transistor T1 and the first electrode (or the fourth node N4) of the light emitting diode LD. For example, a first electrode (for example, a source electrode) of the sixth transistor T6 may be connected to the third node N3 and a second electrode (for example, a drain electrode) may be connected to the fourth node N4. A gate electrode of the sixth transistor T6 may be connected to the emission control line Ei. The sixth transistor T6 may be controlled in the substantially same manner as the fifth transistor T5. When the sixth transistor T6 is turned on, the third node N3 and the fourth node N4 may be electrically connected.

In FIG. 3, it is illustrated that the fifth transistor T5 and the sixth transistor T6 are connected to the same emission control line Ei, but it is illustrative and the present disclosure is not limited thereto. For example, the fifth transistor T5 and the sixth transistor T6 may be connected to separate emission control lines, respectively, to which different emission control signals are supplied.

The seventh transistor T7 may be connected between the first electrode (or the fourth node N4) of the light emitting diode LD and the fourth power line PL4 which supplies the fourth power voltage VAR (hereinafter, referred to as "second initialization voltage"). For example, a first electrode (for example, a source electrode) of the seventh transistor T7 may be connected to the fourth power line PL4 and a second electrode (for example, a drain electrode) may be connected to the fourth node N4. A gate electrode of the seventh transistor T7 may be connected to an i-th fourth scan line (S4*i*, hereinafter, a fourth scan line). When the fourth scan signal is supplied to the fourth scan line S4*i*, the seventh transistor T7 is turned on to supply the second initialization voltage VAR to the fourth node N4 (for example, a first electrode of the light emitting diode LD).

In one exemplary embodiment, when the fourth scan signal is supplied, the second initialization voltage VAR may be supplied to the first electrode of the light emitting diode LD by the turned-on seventh transistor T7. In this case, the parasitic capacitor of the light emitting diode LD may be discharged. As described above, as a residual voltage charged in the parasitic capacitor of the light emitting diode LD is discharged (removed), unintentional micro-light emission may be suppressed. Accordingly, a black expression ability of the pixel PX may be improved.

In the meantime, a voltage level of the first initialization voltage VINI and a voltage level of the second initialization voltage VAR may be different from each other. That is, a voltage which initializes the second node N2 and a voltage which initializes the fourth node N4 may be set to be different from each other.

When the first initialization voltage VINI which is supplied to the second node N2 is significantly low in the low-frequency driving in which a length of one frame period is increased, a strong on-bias is applied to the first transistor T1 (for example, a driving transistor). Accordingly, a threshold voltage of the first transistor T1 in the corresponding frame period may be shifted. Such a hysteresis characteristic may cause a flickering phenomenon in the low-frequency driving. Accordingly, in the display apparatus in the low-frequency driving, the first initialization voltage VINI which is higher than the second power voltage VSS may be required.

However, when a voltage level of the second initialization voltage VAR which is supplied to the fourth node N4 to initialize the light emitting diode LD is higher than a predetermined reference, the parasitic capacitor of the light emitting diode LD may be charged, rather than be discharged. Accordingly, the voltage level of the second initialization voltage VAR should be sufficiently low to discharge the voltage of the parasitic capacitor of the light emitting diode LD. For example, in consideration of the threshold voltage of the light emitting diode LD, a voltage level of the second initialization voltage VAR may be set to be lower than a value obtained by adding the threshold voltage of the light emitting diode LD and the second power voltage VSS.

However, it is illustrative so that the voltage level of the first initialization voltage VINI and the voltage level of the second initialization voltage VAR may be set in various levels. For example, the voltage level of the first initialization voltage VINI and the voltage level of the second initialization voltage VAR may be substantially the same.

The eighth transistor T8 may be connected between the first node N1 (or the first electrode of the first transistor T1) and the fifth power line PL5 which supplies the fifth power voltage VOBS (hereinafter, referred to as "bias voltage"). For example, a first electrode (for example, a source electrode) of the eighth transistor T8 may be connected to the fifth power line PL5 and a second electrode (for example, a drain electrode) may be connected to the first node N1. A gate electrode of the eighth transistor T8 may be connected to the fourth scan line S4*i*.

When the fourth scan signal is supplied to the fourth scan line S4*i*, the eighth transistor T8 is turned on to supply the bias voltage VOBS to the first node N1. In one exemplary embodiment, the bias voltage VOBS may have a level which is similar to a voltage level of a black gray scale data signal. For example, the bias voltage VOBS may have a voltage level of approximately 5 V to 7 V, but it is illustrative and the voltage level of the bias voltage VOBS is not limited thereto.

Accordingly, the eighth transistor T8 is turned on to apply a predetermined high voltage to the first electrode (for example, a source electrode) of the first transistor T1. At this time, when the second transistor T2 is in a turned-on state, the first transistor T1 may be in an on-bias state (a state to be turned on) (that is, to be on-biased).

Here, as the bias voltage VOBS is periodically supplied to the first node N1, the bias state of the first transistor T1 may be periodically changed and a threshold voltage characteristic of the first transistor T1 may be changed. Accordingly, the characteristic of the first transistor T1 may be suppressed from being fixed to a specific state in the low-frequency driving to be degraded.

The storage capacitor Cst may be connected between the first power line PL1 and the second node N2. One electrode of the storage capacitor Cst is connected to the first power line PL1 so that a first power voltage VDD which is a constant voltage may be continuously supplied to one electrode of the storage capacitor Cst. Accordingly, a voltage of the second node N2 is not affected by other parasitic capacitors and may be maintained to a voltage level of a voltage which is directly supplied to the second node N2. That is, the storage capacitor Cst may store a voltage applied to the second node N2.

In the meantime, the first transistor T1, the third transistor T3, the fifth transistor T5, the sixth transistor T6, the seventh transistor T7, and the eighth transistor T8 may be formed as polysilicon semiconductor transistors. For example, the first transistor T1, the third transistor T3, the fifth transistor T5, the sixth transistor T6, the seventh transistor T7, and the eighth transistor T8 may include a polysilicon semiconductor layer which is formed by a low temperature polysilicon (LTPS) process as an active layer (channel). Further, the first transistor T1, the third transistor T3, the fifth transistor T5, the sixth transistor T6, the seventh transistor T7, and the eighth transistor T8 may be P-type transistors (for example, PMOS transistors). Therefore, a gate-on voltage which turns on the first transistor T1, the third transistor T3, the fifth transistor T5, the sixth transistor T6, the seventh transistor T7, and the eighth transistor T8 may be a logic low level.

The polysilicon semiconductor transistor has an advantage of fast response speed so that it may be applied to a switching element which requires fast switching.

The second transistor T2 and the fourth transistor T4 may be formed as oxide semiconductor transistors. For example, the second transistor T2 and the fourth transistor T4 may be N-type oxide semiconductor transistors (for example, NMOS transistors) and include an oxide semiconductor layer as an active layer. Therefore, a gate-on voltage which turns on the second transistor T2 and the fourth transistor T4 may be a logic high level.

The oxide semiconductor transistor may be processed at a low temperature and has a lower charge mobility than the polysilicon semiconductor transistor. That is, the oxide semiconductor transistor has an excellent off-current characteristic. Accordingly, when the second transistor T2 and the fourth transistor T4 are formed as oxide semiconductor transistors, the leakage current from the third node N3 according to the low-frequency driving may be minimized and thus a display quality may be improved.

However, the first to eighth transistors T1 to T8 are not limited thereto. Therefore, at least one of the first transistor T1, the third transistor T3, the fifth transistor T5, the sixth transistor T6, the seventh transistor T7, and the eighth transistor T8 may be formed as an oxide semiconductor transistor. Further, at least one of the second transistor T2 and the fourth transistor T4 may be formed as a polysilicon semiconductor transistor.

Figure 4:
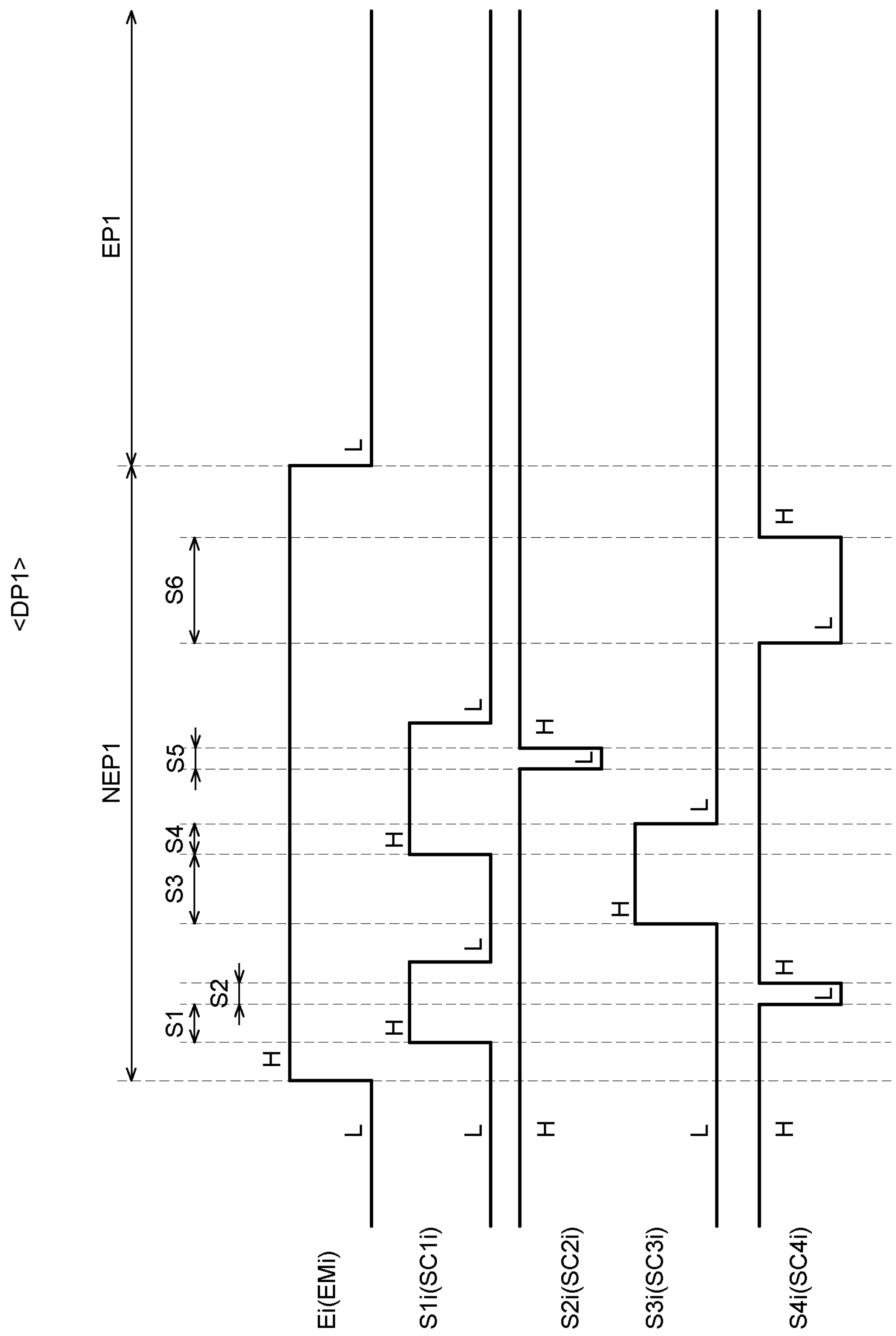
FIG. 4 is a waveform illustrating an example of signals which are supplied to the pixel circuit of FIG. 3 in a first driving period according to exemplary embodiments of the present disclosure.

FIG. 4 is a waveform illustrating an example of signals which are supplied to the pixel circuit of FIG. 1 in a first driving period according to one embodiment.

Figure 5:
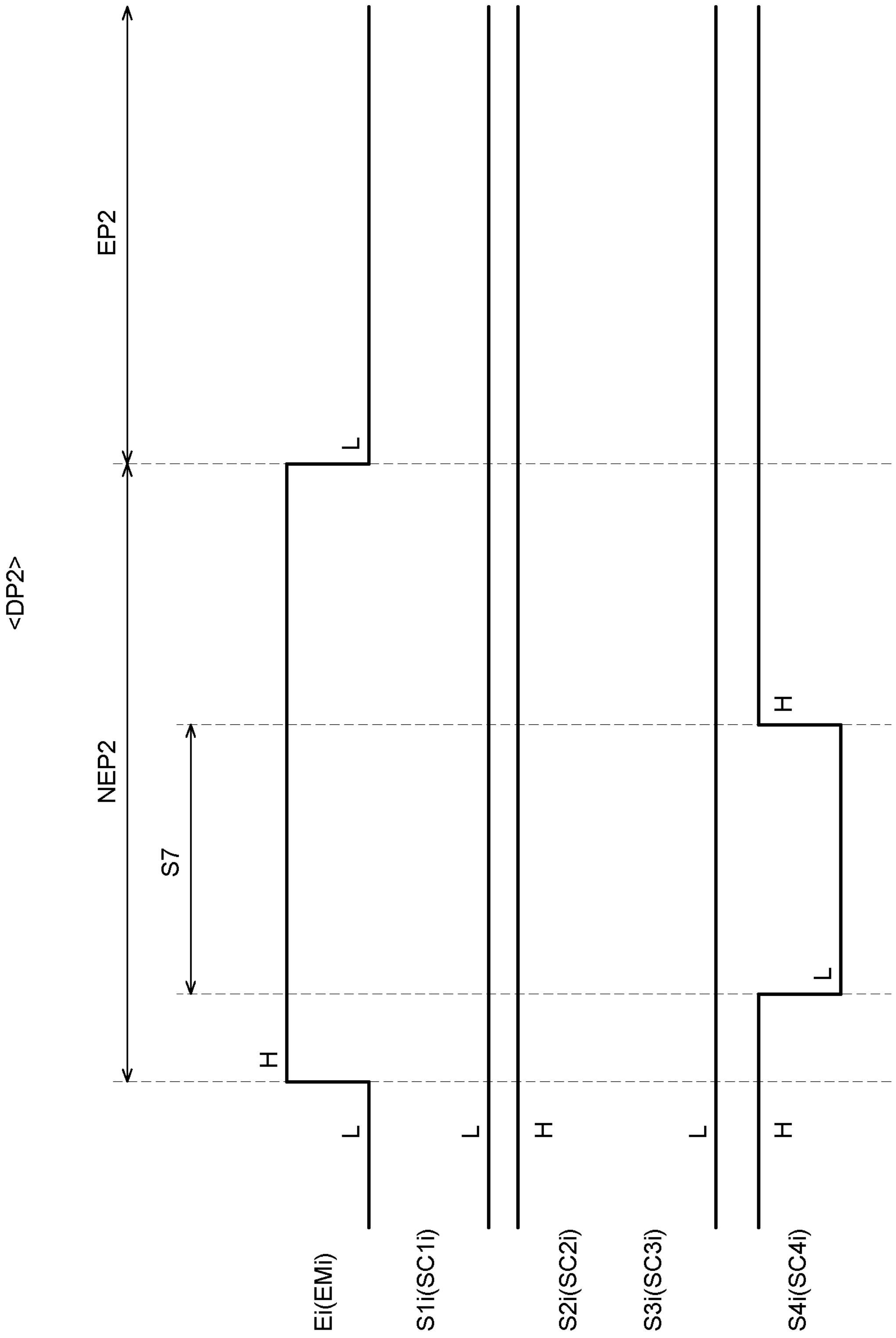
FIG. 5 is a waveform illustrating an example of signals which are supplied to the pixel circuit of FIG. 3 in a second driving period according to exemplary embodiments of the present disclosure.

FIG. 5 is a waveform illustrating an example of signals which are supplied to the pixel circuit of FIG. 3 in a second driving period according to one embodiment.

Figure 6:
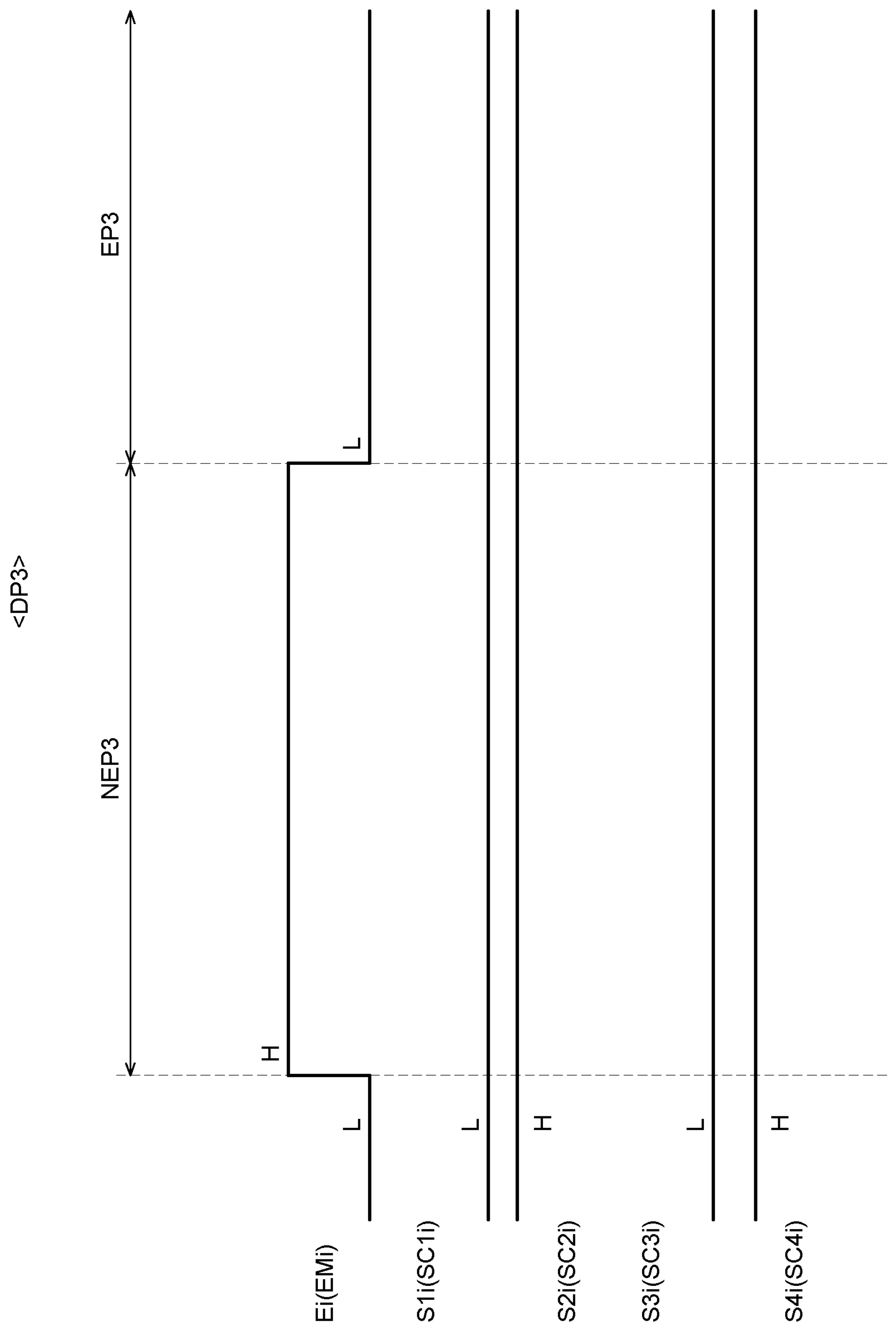
FIG. 6 is a waveform illustrating an example of signals which are supplied to the pixel circuit of FIG. 3 in a third driving period according to exemplary embodiments of the present disclosure.

FIG. 6 is a waveform illustrating an example of signals which are supplied to the pixel circuit of FIG. 3 in a third driving period according to one embodiment.

Figure 7:
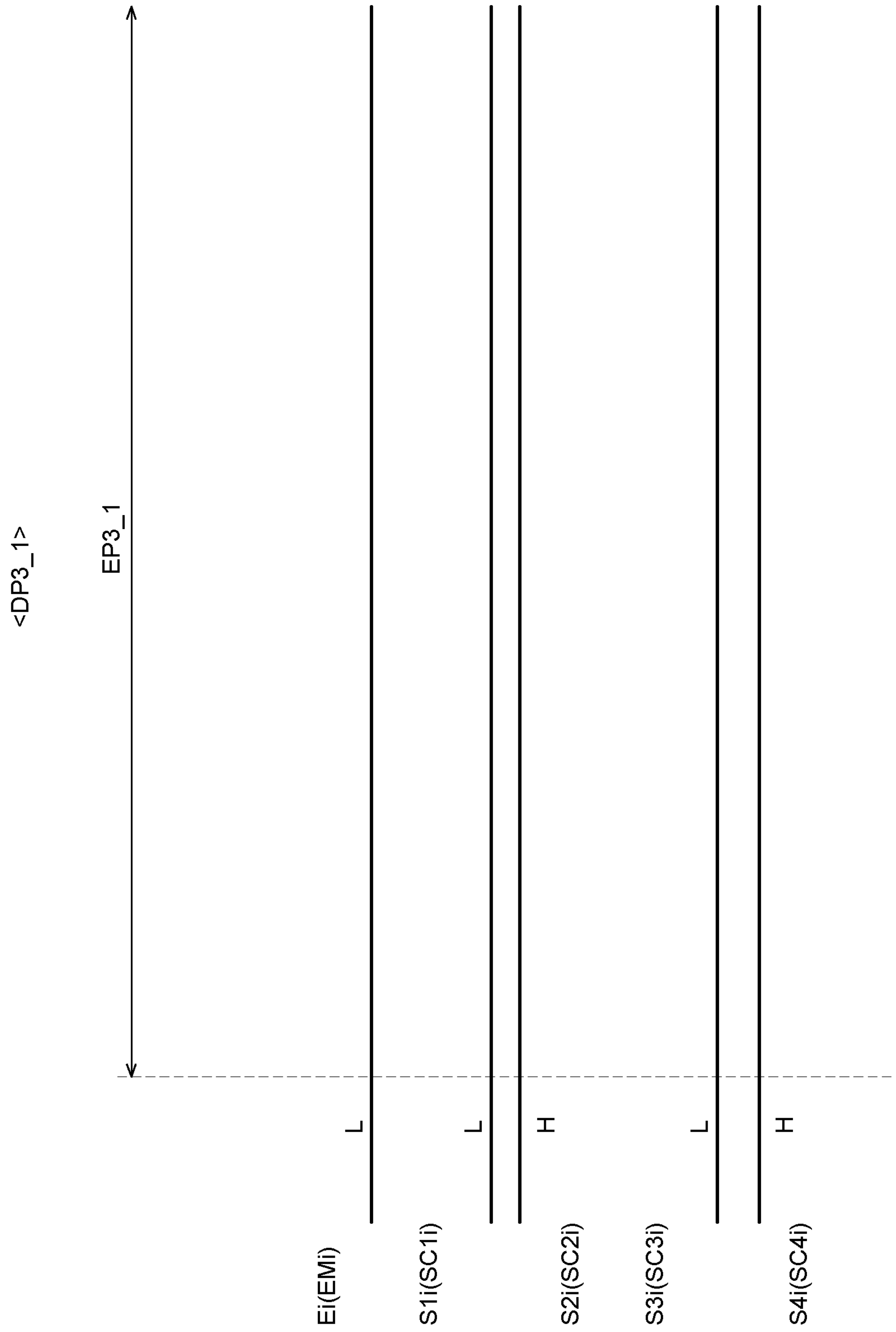
FIG. 7 is a waveform illustrating another example of signals which are supplied to the pixel circuit of FIG. 3 in a third driving period according to exemplary embodiments of the present disclosure.

FIG. 7 is a waveform illustrating another example of signals which are supplied to the pixel circuit of FIG. 3 in a third driving period according to one embodiment.

FIGS. 8A to 8G are equivalent circuit diagrams illustrating an example of a state of the pixel circuit of FIG. 3 in first to seventh periods, respectively, according to one embodiment.

Referring to FIGS. 3, 4, 5, and 6, the pixel PX may operate through a first driving period DP1, a second driving period DP2, or a third driving period DP3.

In the variable frequency driving in which the frame frequency is controlled, one frame period may include the first driving period DP1. Further, the second driving period DP2 or the third driving period DP3 may proceed at least once depending on the frame frequency. For example, in one frame period, after driving the display apparatus 1000 by the first driving period DP1, the display apparatus 1000 may be driven by the second driving period DP2 or the third driving period DP3.

The first driving period DP1 may include a first non-emission period NEP1 and a first emission period EP1 as shown in FIG. 4. The second driving period DP2 may include a second non-emission period NEP2 and a second emission period EP2 as shown in FIG. 5. The third driving period DP3 may include a third non-emission period NEP3 and a third emission period EP3 as shown in FIG. 6. Here, the first to third non-emission periods NEP1, NEP2, and NEP3 may refer to periods in which a path of a driving current flowing from the first power line PL1 to the second power line PL2 via the light emitting diode LD is blocked. The first to third emission periods EP1, EP2, and EP3 may refer to periods in which the path of the driving current is formed so that the light emitting diode LD emits light based on the driving current.

The first driving period DP1 may include a period in which a data signal which actually corresponds to an output image is written. For example, the data signal may be written in every first driving period DP1.

In the second driving period DP2, the data signal is not supplied and the fourth scan signal SC4*i* may be supplied to the fourth scan line S4*i* to control the first transistor T1 (for example, a driving transistor) of the pixel PX in an on-bias state and initialize the light emitting diode LD. Further, in the third driving period DP3, the data signal may not be supplied and the fourth scan signal SC4*i* may not be supplied either.

Here, when one frame period includes a second driving period DP2, as described with reference to FIG. 5, the display apparatus 1000 may supply the fourth scan signal SC4*i* to the fourth scan line S4*i* for panel refresh. In contrast, when one frame period includes the third driving period DP3, as described with reference to FIG. 6, the display apparatus 1000 may not supply the fourth scan signal SC4*i* to the fourth scan line S4*i* so that the mura phenomenon is not visible to the user.

As illustrated in FIGS. 4 and 5, the first non-emission period NEP1 may include first to sixth periods S1 to S6 and the second non-emission period NEP2 may include a seventh period S7.

In one exemplary embodiment, the first to third scan signals SC1*i*, SC2*i*, and SC3*i* which are supplied to the first to third scan lines S1*i*, S2*i*, and S3*i*, respectively, may be supplied only in the first non-emission period NEP1. In the meantime, the first scan signal SC1*i* may be supplied plural times for the first non-emission period NEP1.

In one exemplary embodiment, the fourth scan signal SC4*i* which is supplied to the fourth scan line S4*i* may be supplied in the first non-emission period NEP1 and the second non-emission period NEP2.

As illustrated in FIG. 4, the fourth scan signal SC4*i* may be supplied to the fourth scan line S4*i* plural times in the first non-emission period NEP1. Further, as illustrated in FIG. 5, the fourth scan signal SC4*i* may be supplied to the fourth scan line S4*i* one time in the second non-emission period NEP2. However, the exemplary embodiment of the present disclosure is not limited thereto and for example, the fourth scan signal SC4*i* may be supplied to the fourth scan line S4*i* plural times in the second non-emission period NEP2.

In the meantime, in the third driving period DP3, as described above, the fourth scan signal SC4*i* may not be supplied.

In one exemplary embodiment, each of the second scan signal SC2*i* and the fourth scan signal SC4*i* may overlap the first scan signal SC1*i* in at least partial period.

The first scan signal SC1*i* and the third scan signal SC3*i* supplied to the n-type oxide semiconductor transistor (for example, the second transistor T2 and the fourth transistor T4) may be high levels H. The second scan signal SC2*i* and the fourth scan signal SC4*i* supplied to the p-type polysilicon semiconductor transistors (for example, the third transistor T3, the seventh transistor T7, and the eighth transistor T8) may be low levels L.

In the meantime, first to fourth scan signals SC1*i*, SC2*i*, SC3*i*, and SC4*i* may be supplied from a scan driver (for example, the scan driver 200 of FIG. 1). For example, the first to fourth scan signals SC1*i*, SC2*i*, SC3*i*, and SC4*i* may be supplied from the first to fourth scan drivers 210, 220, 230, and 240 of FIG. 2, respectively.

The emission control signal EMi which is supplied to the emission control line Ei may be maintained at a high level H (or a gate-off level) during a first non-emission period NEP1 of the first driving period DP1, may be maintained at a high level H (or a gate-off level) during the second non-emission period NEP2 of the second driving period DP2, and may be maintained at a high level H (or a gate-off level) during a third non-emission period NEP3 of the third driving period DP3. Accordingly, each of the fifth transistor T5 and the sixth transistor T6 may be maintained in a turn-off state during the first non-emission period NEP1, the second non-emission period NEP2, and the third non-emission period NEP3. Therefore, the path of the driving current flowing from the first power line PL1 to the second power line PL2 via the light emitting diode LD during the first non-emission period NEP1, the second non-emission period NEP2, and the third non-emission period NEP3 may be blocked.

Hereinafter, scan signals SC1*i*, SC2*i*, SC3*i*, and SC4*i* supplied during a first driving period DP1, a second driving period DP2, and a third driving period DP3 and an operation of a pixel PX will be described in detail with reference to FIGS. 3, 4, 5, and 6.

In the meantime, the first driving period DP1 will be described in more detail further with reference to FIGS. 8A to 8G.

First, the first driving period DP1 will be described with reference to FIGS. 3 and 4. A high level H (or a gate-off level) of emission control signal EMi may be supplied to the emission control line Ei during the first non-emission period NEP1. Accordingly, the fifth transistor T5 and the sixth transistor T6 may be turned-off during the first non-emission period NEP1. The first non-emission period NEP1 may include first to sixth periods S1 to S6.

Figure 8A:
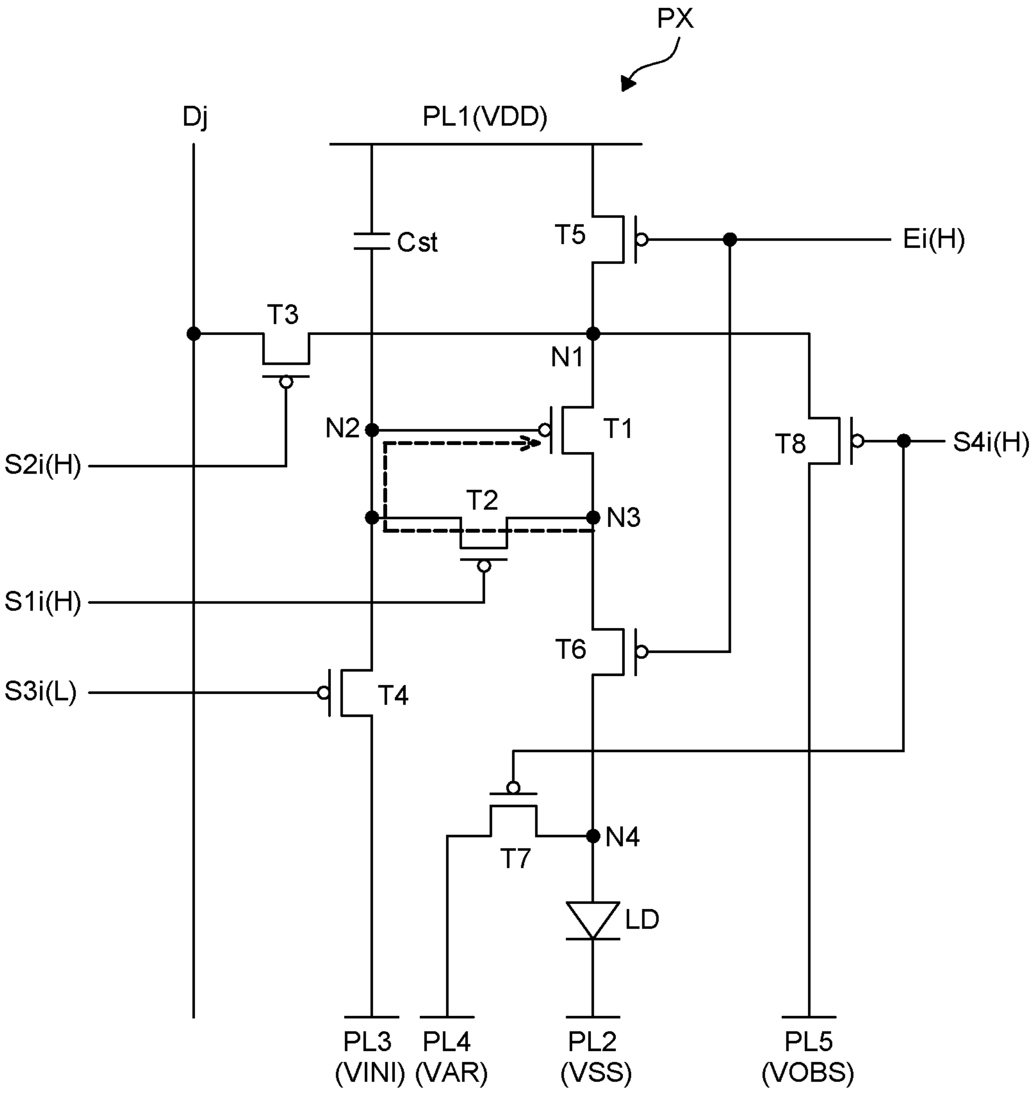
FIGS. 8A to 8G are equivalent circuit diagrams illustrating an example of a state of the pixel circuit of FIG. 3 in first to seventh periods, respectively, according to exemplary embodiments of the present disclosure.

First, in the first period S1, the first scan signal SC1*i* may be supplied to the first scan line S1*i*. As illustrated in FIG. 8A, when the first scan signal SC1*i* is supplied, the second transistor T2 may be turned on. The second transistor T2 is turned on so that the second node N2 and the third node N3 may be conducted. That is, the gate electrode and the second electrode (for example, the drain electrode) of the first transistor T1 may be connected.

Thereafter, in the second period S2, the first scan signal SC1*i* may be supplied to the first scan line S1*i* and the fourth scan signal SC4*i* may be supplied to the fourth scan line S4*i*. In one exemplary embodiment, the supplying of the first scan signal SC1*i* supplied during the first period S1 may be maintained until the second period S2. That is, after supplying the first scan signal SC1*i*, the fourth scan signal SC4*i* may be supplied. Accordingly, in the first and second periods S1 and S2, after the second transistor T2 is turned on, the seventh transistor T7 and the eighth transistor T8 may be turned on.

In the meantime, when the first scan signal SC1*i* is not supplied, but only the eighth transistor T8 is turned on, a bias voltage VOBS may be supplied to the first node N1, that is, the source electrode of the first transistor T1. Here, the bias voltage VOBS which is a high voltage is applied to the first node N1 so that the first transistor T1 may have an on-bias state. For example, when the bias voltage VOBS is approximately 5 V or higher, the first transistor T1 has a source voltage and a drain voltage of approximately 5 V or higher and an absolute value of the gate-source voltage of the first transistor T1 may be increased.

In this state, when the data signal is supplied by supplying the second scan signal SC2*i*, the driving current is unintentionally changed by the influence of the bias state of the first transistor T1 and the image luminance may fluctuate (for example, a luminance is increased).

In order to solve this problem, the scan driver (for example, the scan driver 200 of FIG. 1) may supply the first scan signal SC1*i* earlier than the fourth scan signal SC4*i* in the first period S1 and the second period S2. Accordingly, the second transistor T2 may be turned on before the eighth transistor T8.

Figure 8B:
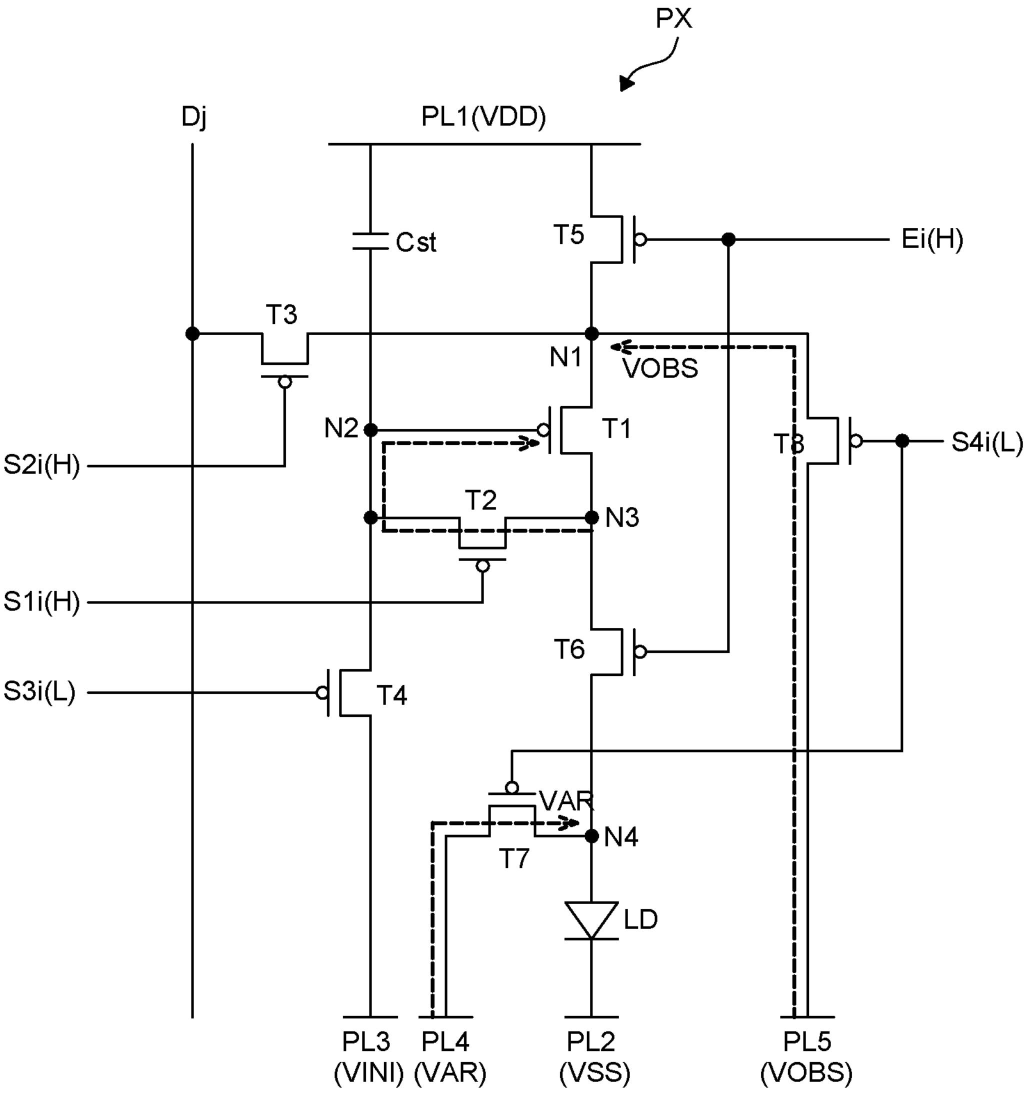

Here, as illustrated in FIG. 8B, in the second period S2, the second transistor T2 is turned on so that the second node N2 and the third node N3 may be connected (that is, the second electrode and the gate electrode of the first transistor T1 are connected). Thereafter, when the eighth transistor T8 is turned on, the bias voltage VOBS may be transmitted to the second node N2 through the first node N1. For example, a voltage difference between the first node N1 and the second node N2 may be reduced to a threshold voltage level of the first transistor T1. Accordingly, in the second period S2, a magnitude of the gate-source voltage of the first transistor T1 may be very low. For example, the first transistor T1 may be set in an off-bias state.

As described above, in order to suppress unintended increase of luminance by supplying the bias voltage VOBS before writing the data signal in the second period S2, supplying of the first scan signal SC1*i* and the fourth scan signal SC4*i* may be controlled to turn on the eighth transistor T8 in the turned-on state of the second transistor T2.

In one exemplary embodiment, a width of the first scan signal SC1*i* in the first period S1 and the second period S2 (for example, a width of a period in which the first scan signal SC1*i* is supplied at a high level H) may be larger than a width of the fourth scan signal SC4*i* (for example, a width of a period in which the fourth scan signal SC4*i* is supplied at a low level L). For example, in a period including the first period S1 and the second period S2, the second transistor T2 is turned on before the eighth transistor T8 is turned on and after the eighth transistor T8 is turned off (that is, after the second period S2), the second transistor T2 may be turned off.

However, this is illustrative and the second transistor T2 may be turned off before the eighth transistor T8 is turned off.

In the meantime, the seventh transistor T7 may be turned on by the fourth scan signal SC4*i* supplied in the second period S2. Accordingly, the second initialization voltage VAR may be supplied to the first electrode of the light emitting diode LD (that is, the fourth node N4). Therefore, the first electrode (anode electrode) of the light emitting diode LD may be initialized based on the voltage level of the second initialization voltage VAR. That is, the parasitic capacitor of the light emitting diode LD may be discharged by the second initialization voltage VAR. Accordingly, a black expression ability of the pixel PX may be improved.

Figure 8C:
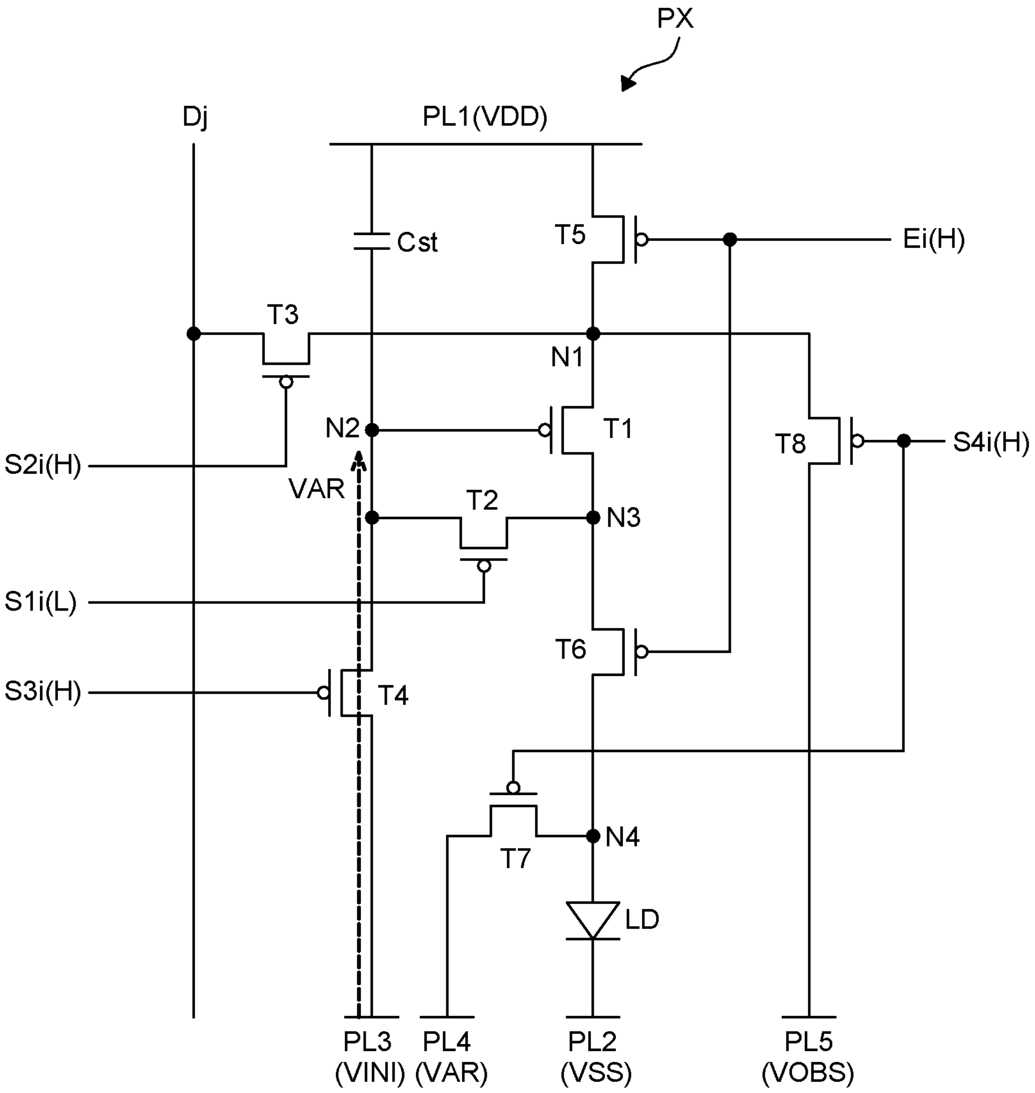

Thereafter, in the third period S3, the third scan signal SC3*i* may be supplied to the third scan line S3*i*. As illustrated in FIG. 8C, when the fourth transistor T4 may be turned on by the third scan signal SC3*i*. When the fourth transistor T4 is turned on, the first initialization voltage VINI may be supplied to the gate electrode of the first transistor T1. That is, in the third period S3, the gate voltage of the first transistor T1 may be initialized based on the first initialization voltage VINI. Accordingly, a strong on-bias is applied to the first transistor T1 and a hysteresis characteristic may be changed (for example, the threshold voltage is shifted).

In the meantime, the supplying of the third scan signal SC3*i* may be maintained after the third period S3. For example, as illustrated in FIG. 4, the third scan signal SC3*i* may maintain a high level H (or a gate-on level) during the fourth period S4 after the third period S3. However, the exemplary embodiment of the present disclosure is not limited thereto and the third scan signal SC3*i* may be shifted from the high level H to the low level L in response to the end of the third period S3.

Figure 8D:
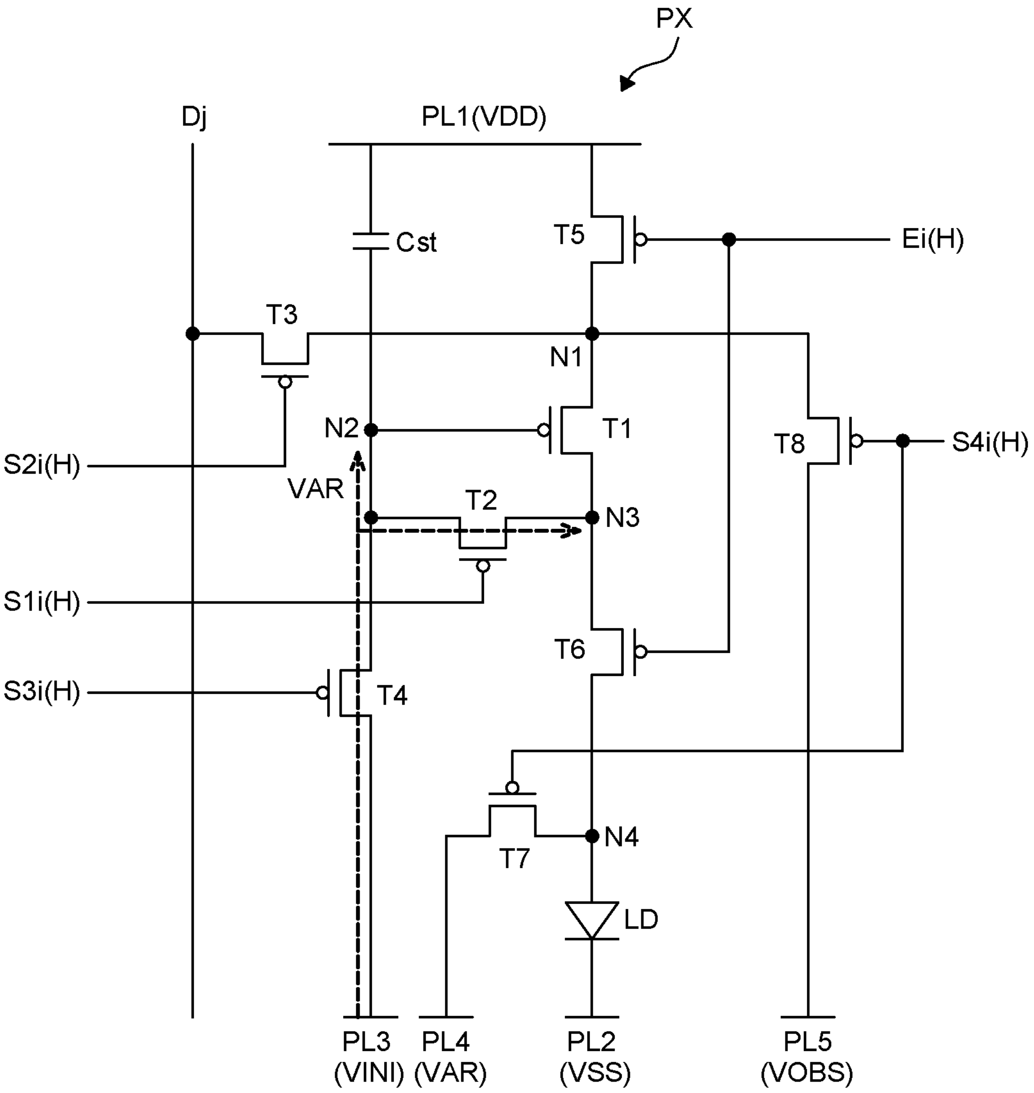

Thereafter, in the fourth period S4, the first scan signal SC1*i* may be supplied to the first scan line S1*i*. As illustrated in FIG. 8D, when the second transistor T2 may be turned on again in response to the first scan signal SC1*i*.

Figure 8E:
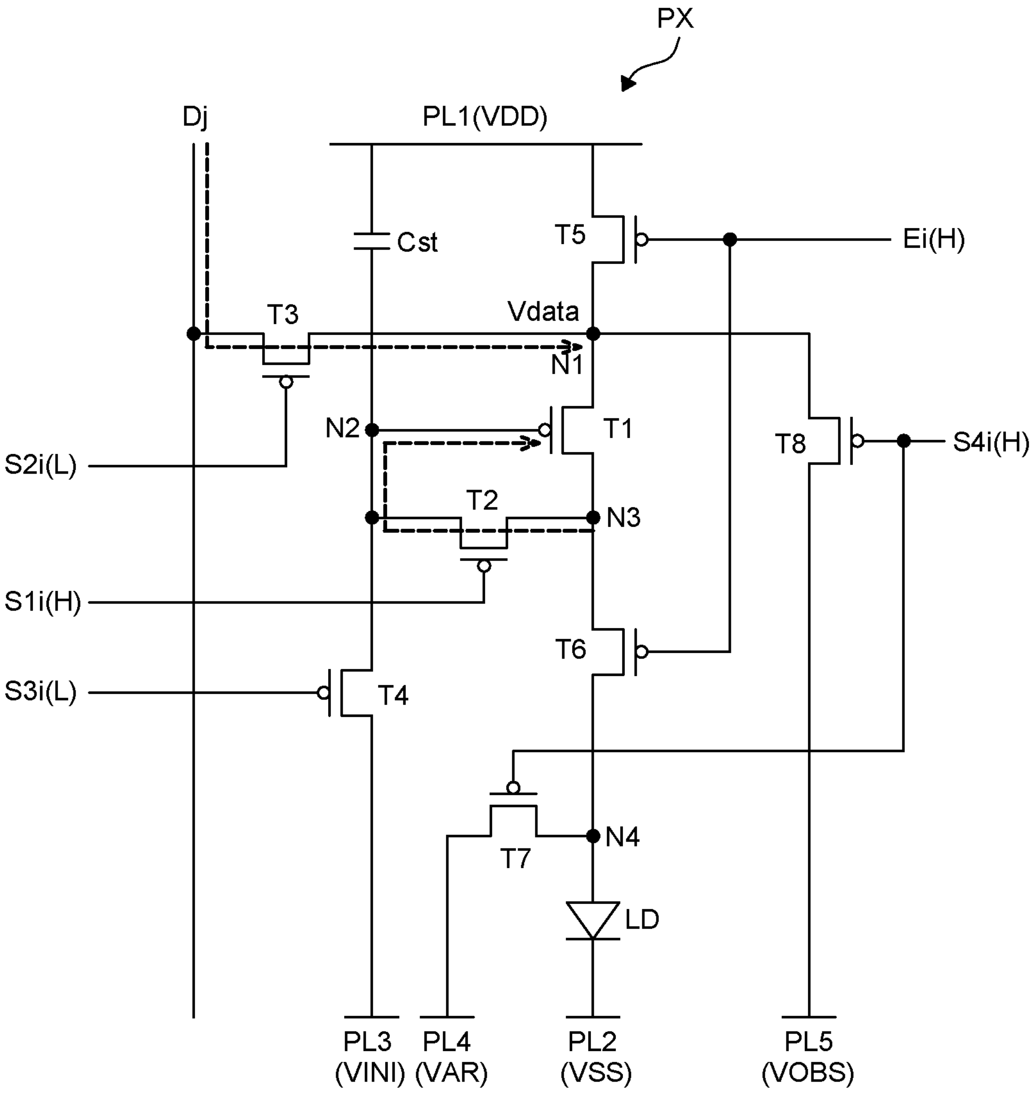

Thereafter, in the fifth period S5, the second scan signal SC2*i* may be supplied to the second scan line S2*i* by partially overlapping the first scan signal SC1*i*. As illustrated in FIG. 8E, the third transistor T3 is turned on by the second scan signal SC2*i* and the data signal Vdata may be supplied to the first node N1.

At this time, as illustrated in FIG. 8E, the first transistor T1 may be connected in the form of diode, the data signal may be written, and the threshold voltage may be compensated by the turned-on second transistor T2. In the meantime, before supplying the second scan signal SC2*i* and after stopping supplying of the second scan signal SC2*i*, the first scan signal SC1*i* is supplied so that the threshold voltage of the first transistor T1 may be compensated for a sufficient time.

Figure 8F:
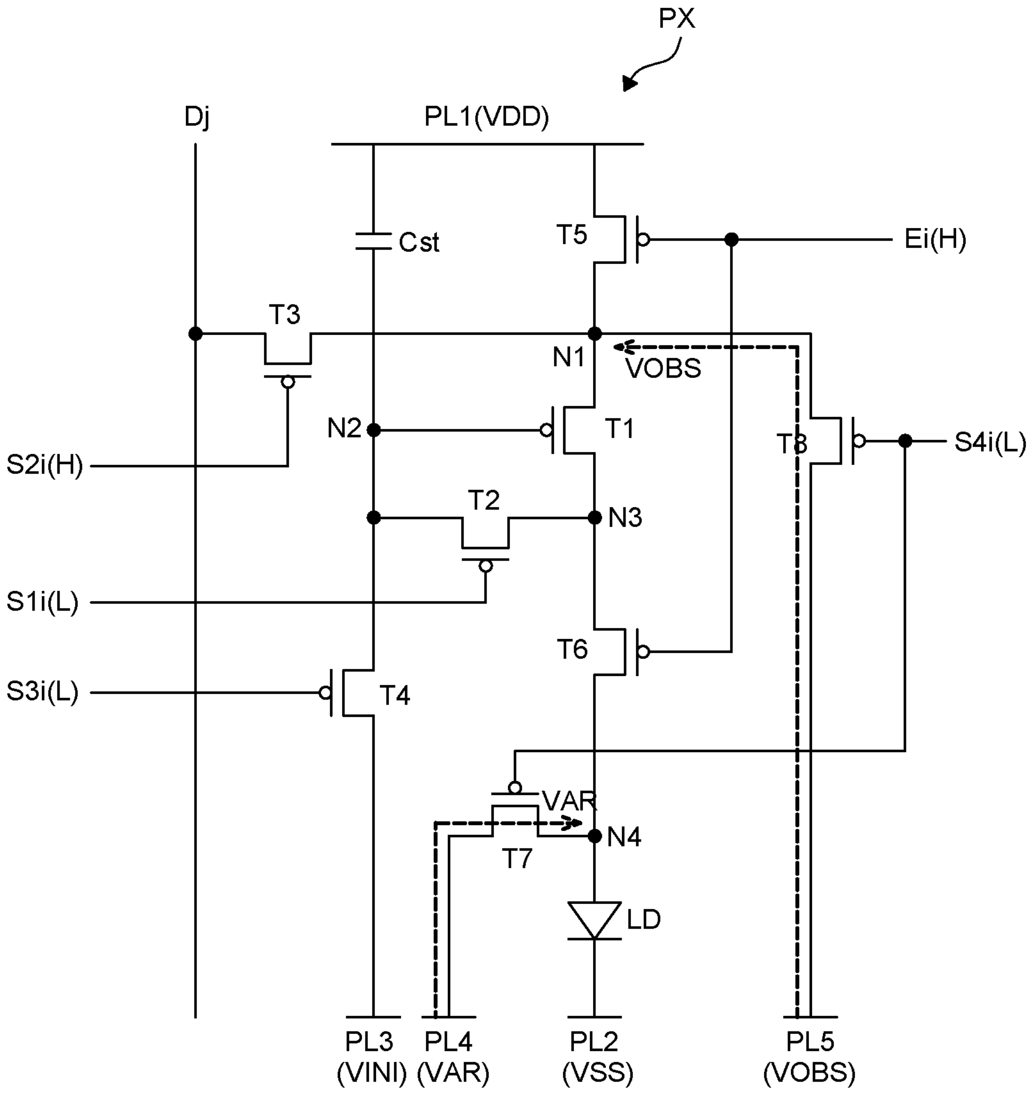

Thereafter, in the sixth period S6, the fourth scan signal SC4*i* may be supplied to the fourth scan line S4*i* again. Accordingly, as illustrated in FIG. 8F, the seventh transistor T7 and the eighth transistor T8 may be turned on. The eighth transistor T8 is turned on so that the bias voltage VOBS may be supplied to the first node N1.

In the meantime, the influence of the strong on-bias applied during the third period S3 may be removed by the writing of the data signal and the compensation of the threshold voltage. For example, a voltage difference of the gate voltage and the source voltage (and a drain voltage) of the first transistor T1 may be significantly reduced by the threshold voltage compensation in the first scan signal SC1*i* supplying period including the fourth period S4 and the fifth period S5. By doing this, the characteristic of the first transistor T1 is changed again and the driving current of the first emission period EP1 may be increased or a change in the black grayscale may be visible.

In order to suppress such a characteristic change, in the sixth period S6, the eighth transistor T8 may be turned on by supplying the fourth scan signal SC4*i*. Accordingly, the bias voltage VOBS is supplied to the first electrode (for example, a source electrode) of the first transistor T1 in the sixth period S6 so that the first transistor T1 may be set to an on-bias state.

Further, as illustrated in FIG. 8F, the second initialization voltage VAR may be supplied to the first electrode (that is, a fourth node N4) of the light emitting diode LD by the seventh transistor T7 which is turned on in the sixth period S6. Therefore, the first electrode (anode electrode) of the light emitting diode LD may be initialized based on the voltage level of the second initialization voltage VAR.

Figure 8G:
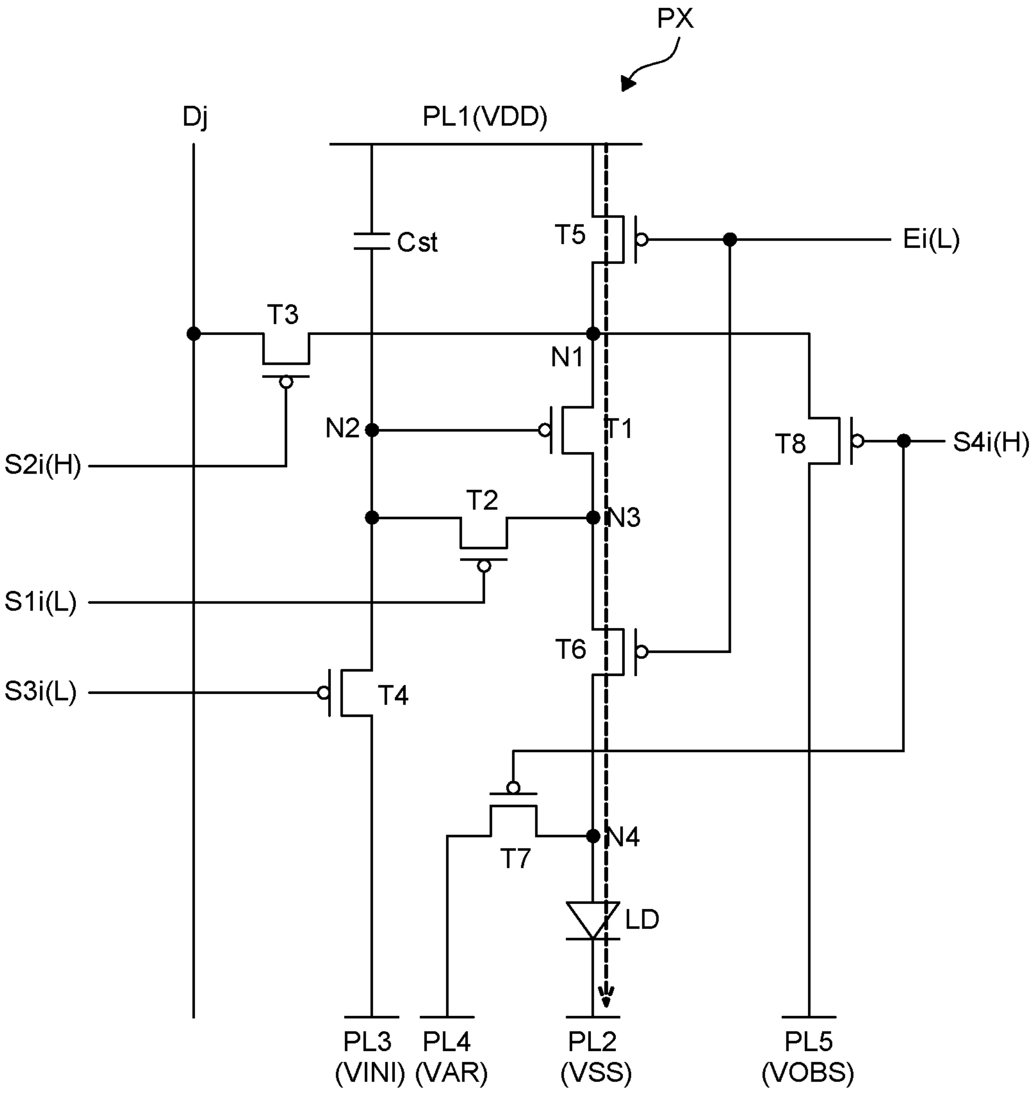

After the sixth period S6, the supplying of the emission control signal EMi to the emission control line Ei is stopped (for example, the emission control signal EMi is shifted to the low level L) so that the first non-emission period NEP1 ends and the first emission period EP1 may proceed. In this case, as illustrated in FIG. 8G, in the first emission period EP1, the fifth and sixth transistors T5 and T6 may be turned on.

In the first emission period EP1, a driving current corresponding to a data signal written in the fifth period S5 is supplied to the light emitting diode LD and the light emitting diode LD may emit light based on the driving current.

Next, the second driving period DP2 will be described with reference to FIGS. 3 and 5. As illustrated in FIG. 5, the second driving period DP2 may include a second non-emission period NEP2 and a second emission period EP2 and the second non-emission period NEP2 may include a seventh period S7.

In one exemplary embodiment, a waveform of the emission control signal EMi in the second driving period DP2 may be substantially the same as a waveform of the emission control signal EMi in the first driving period DP1.

In one exemplary embodiment, in the second driving period DP2, first to third scan signals SC1*i*, SC2*i*, and SC3*i* may not be supplied. For example, in the second driving period DP2, low levels L (or a gate-off level) of first and third scan signals SC1*i* and SC3*i* may be supplied to the first and third scan lines S1*i* and S3*i*, respectively and a high level H (or a gate-off level) of second scan signal SC2*i* may be supplied to the second scan line S2*i*. Accordingly, in the second driving period DP2, second to fourth transistors T2, T3, and T4 may maintain a turn-off state.

In the seventh period S7 of the second non-emission period NEP2, the fourth scan signal SC4*i* may be supplied to the fourth scan line S4*i*. For example, the low level L (or a gate-on level) of fourth scan signal SC4*i* may be supplied to the fourth scan line S4*i*. Accordingly, the seventh and eighth transistors T7 and T8 may be turned on.

In the seventh period S7, the seventh transistor T7 is turned on so that the second initialization voltage VAR may be supplied to the first electrode of the light emitting diode LD (that is, the fourth node N4). Therefore, the first electrode of the light emitting diode LD may be initialized based on the second initialization voltage VAR.

Further, in the seventh period S7, the eighth transistor T8 is turned on so that the bias voltage VOBS may be supplied to the first electrode of the first transistor T1 (or the first node N1).

After the seventh period S7, the supplying of the emission control signal EMi to the emission control line Ei is stopped (for example, the emission control signal EMi is shifted to the low level L) so that the second non-emission period NEP2 ends and the second emission period EP2 may proceed. In the second emission period EP2, the fifth and sixth transistors T5 and T6 may be turned on.

In the second emission period EP2, a driving current corresponding to a data signal written in the first driving period DP1 is supplied to the light emitting diode LD and the light emitting diode LD may emit light based on the driving current.

In the meantime, in FIG. 5, it is described that the fourth scan signal SC4*i* is supplied to the fourth scan line S4*i* one time in the second non-emission period NEP2, but the exemplary embodiment of the present disclosure is not limited thereto and for example, in the second non-emission period NEP2, the fourth scan signals SC4*i* may be supplied plural times.

Next, the third driving period DP3 will be described with reference to FIGS. 3 and 6. As illustrated in FIG. 6, the third driving period DP3 may include a third non-emission period NEP3 and a third emission period EP3.

In one exemplary embodiment, a waveform of the emission control signal EMi in the third driving period DP3 may be substantially the same as a waveform of the emission control signal EMi in the first driving period DP1.

In one exemplary embodiment, in the third driving period DP3, first to fourth scan signals SC1*i*, SC2*i*, SC3*i*, and SC4*i* may not be supplied. For example, in the third driving period DP3, low levels L (or a gate-off level) of first and third scan signals SC1*i* and SC3*i* may be supplied to the first and third scan lines S1*i* and S3*i*, respectively and high levels H (or a gate-off level) of second and fourth scan signals SC2*i* and SC4*i* may be supplied to the second and fourth scan lines S2*i* and S4*i*. Accordingly, in the third driving period DP3, the second, third, fourth, seventh, and eighth transistors T2, T3, T4, T7, and T8 may maintain a turn-off state.

As described above, in the third driving period DP3, all the first to fourth scan signals SC1*i*, SC2*i*, SC3*i*, and SC4*i* which are supplied to the second, third, fourth, seventh, and eighth transistors T2, T3, T4, T7, and T8 are maintained at the gate-off level so that the number of times of turn-on of the transistors is reduced. Accordingly, the mura phenomenon as described above may not occur.

In the meantime, in FIG. 6, it is illustrated that in the third driving period DP3 in which the first to fourth scan signals SC1*i*, SC2*i*, SC3*i*, and SC4*i* are not supplied, the emission control signal EMi is supplied to be separately driven in the third non-emission period NEP3 and the third emission period EP3. However, the exemplary embodiment of the present disclosure is not limited thereto.

For example, referring to FIG. 7, in the third driving period DP3_1 in which the first to fourth scan signals SC1*i*, SC2*i*, SC3*i*, and SC4*i* are not supplied, the emission control signal EMi may maintain a low level L (for example, a gate-on level). That is, in the third driving period DP3_1, the fifth and sixth transistors T5 and T6 are maintained in the turn-on state so that the light emitting diode LD may continuously emit light based on the driving current (that is, maintained in the third emission period EP3_1). In this case, the third driving period DP3_1 in which the scan signals are not supplied does not include an unnecessary non-emission period so that the image quality may be further improved.

Figure 9A:
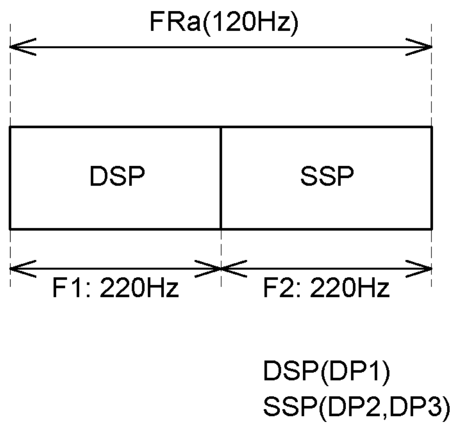
FIGS. 9A to 9C are views for explaining examples of driving of the display apparatus of FIG. 1 according to a frame frequency according to exemplary embodiments of the present disclosure.
Figure 9B:
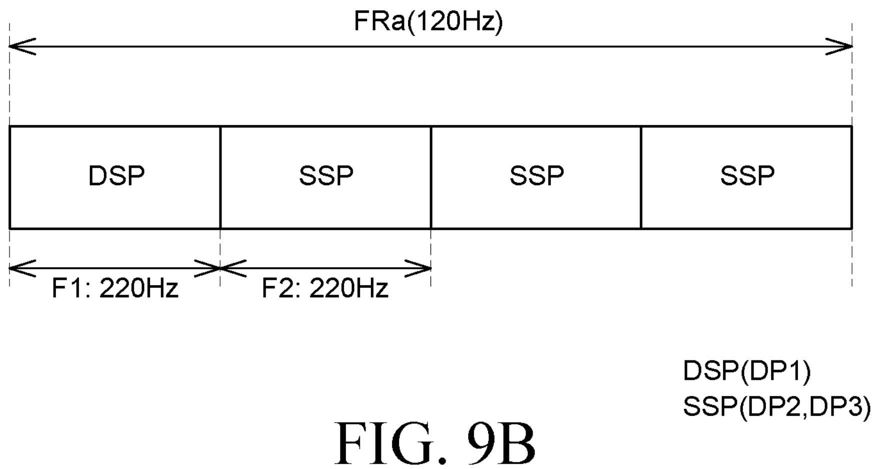
Figure 9C:
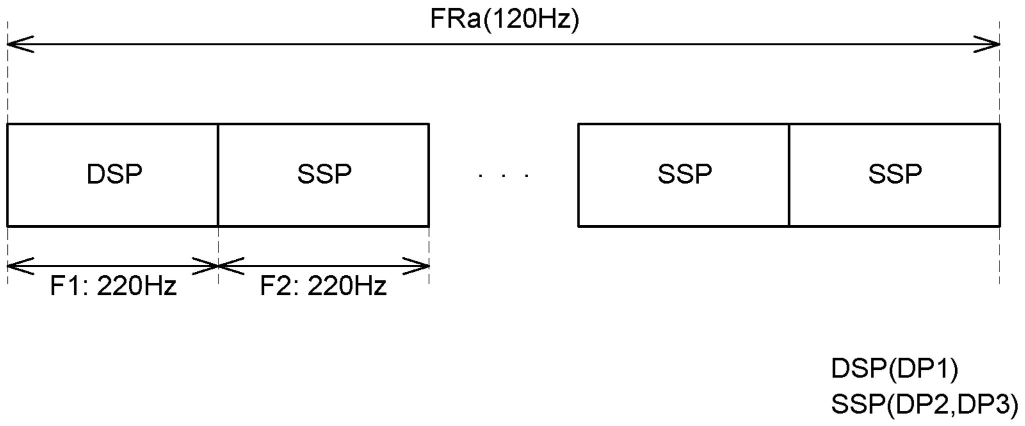

FIGS. 9A to 9C are views for explaining examples of driving of a display apparatus of FIG. 1 according to a frame frequency according to one embodiment.

Referring to FIGS. 1, 3, 4, 5, 6, and 9A to 9C, the display apparatus 1000 may be driven at various frame frequencies. Here, one frame period may include one display scan period DSP in which a data signal is written in the pixel PX and at least one self-scan period SSP in which panel refresh proceeds. Here, the display scan period DSP may be driven as the first driving period DP1 which has been described with reference to FIG. 4 and the self-scan period SSP may be driven as the second driving period DP2 or the third driving period DP3 which has been described with reference to FIGS. 5 and 6, respectively.

Here, a frequency of the display scan period DSP, that is, the first driving period DP1 may correspond to a frame frequency of the display apparatus 1000.

In one exemplary embodiment, one frame period FRa illustrated in FIG. 9A may include one display scan period DSP and one self-scan period SSP. For example, the display scan period DSP and the self-scan period SSP may be repeated. For example, when the frequencies of the display scan period DSP and the self-scan period SSP are 240 Hz, respectively, the frame period FRa of FIG. 9A may be driven at 120 Hz. For example, a length of the display scan period DSP and the self-scan period SSP may be approximately 4.17 ms and a length of one frame period Fra illustrated in FIG. 9A may be approximately 8.33 ms.

In one exemplary embodiment, one frame period FRb illustrated in FIG. 9B may include one display scan period DSP and three self-scan periods SSP. For example, one display scan period DSP and three self-scan periods SSP may be repeated. For example, when the frequencies of the display scan period DSP and each self-scan period SSP are 240 Hz, respectively, the frame period FRb of FIG. 9B may be driven at 60 Hz. For example, a length of the display scan period DSP and each self-scan periods SSP may be approximately 4.17 ms and a length of one frame period FRb illustrated in FIG. 9B may be approximately 16.67 ms.

In one exemplary embodiment, a frame period FRc illustrated in FIG. 9C may include one display scan period DSP and a plurality of repeated self-scan periods SSP. For example, when the frame period FRc of FIG. 9C is driven at 1 Hz, the length of the frame period FRc illustrated in FIG.

9C may be approximately 1 second and the self-scan periods SSP may be repeated approximately 239 times in the frame period FRc.

As described above, the number of times of repeating of the self-scan period SSP in one frame period is controlled so that the display apparatus 1000 may be freely driven at various frame frequencies (for example, 1 Hz to 120 Hz).

Figure 10:
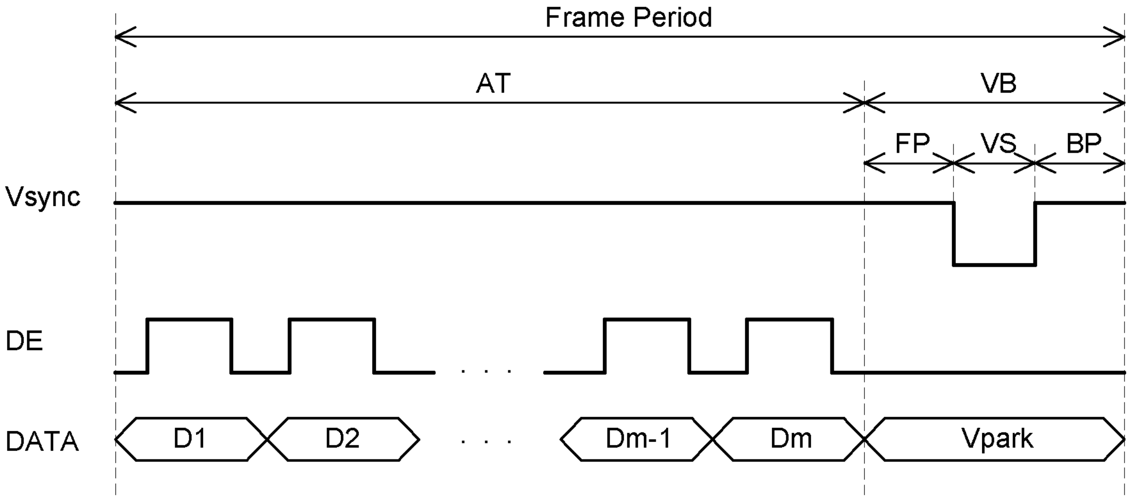
FIG. 10 is a waveform for explaining an example of driving of the display apparatus of FIG. 1 in an active period and a vertical blank period included in one frame period according to exemplary embodiments of the present disclosure.

FIG. 10 is a waveform for explaining an example of driving of a display apparatus 1000 of FIG. 1 in an active period and a vertical blank period included in one frame period.

In the meantime, in FIG. 10, a vertical synchronization signal Vsync, a data enable signal DE, and data signals DATA supplied to data lines D1 to Dm which are supplied in one frame period are illustrated.

Referring to FIGS. 1, 3, and 10, one frame period may include an active period AT in which active data corresponding to an input image is supplied to the pixels PX and a vertical blank period VB.

The vertical blank period VB may correspond a blank period in which active data is not received by the timing controller 500 between an active period AT of one frame period and an active period AT of a subsequent frame period.

In one exemplary embodiment, the vertical blank period VB may include a vertical sink time VS, a vertical front porch FP, and a vertical back porch BP. Here, the vertical sink time VS may correspond to a period in which the vertical synchronization signal Vsync has a low level.

The vertical synchronization signal Vsync may define one frame period. For example, a period including a period (that is, a vertical sink time VS) in which the vertical synchronization signal Vsync has a low level of pulse is defined as a vertical blank period VB so that active period AT of each of the frame periods is distinguished to define one frame period.

One pulse period of the data enable signal DE may correspond to one horizontal period 1H (for example, correspond to one pulse period of the horizontal synchronization signal). The data enable signal DE may define an effective data period including active data to be written in the pixels PX during the active period AT. A pulse of the data enable signal DE may be synchronized with active data to be written in the pixels PX disposed in one horizontal line of the pixel unit 100.

The data signals DATA may include active data AD1 to ADn to be supplied to the data lines D1 to Dm in response to the pulse of each data enable signal DE in the active period AT. For example, in response to the scan signal (for example, the second scan signal SC2*i*) supplied in the unit of horizontal line, the active data AD1 to ADn may be sequentially supplied to the data lines D1 to Dm in every horizontal line.

Further, as described above, a parking voltage Vpark may be supplied to the data lines D1 to Dm in the vertical blank period VB included in one frame period. For example, the parking voltage Vpark supplied in the vertical blank period VB may be maintained at a constant voltage level. In this case, each of the data lines D1 to Dm is maintained at a constant voltage level by the parking voltage Vpark so that the magnitude of the parasitic capacitor in the pixel PX is constantly maintained to suppress the lowering of the luminance of the display apparatus 1000. Therefore, the image quality may be improved.

In the meantime, the vertical blank period VB may overlap the self-scan period SSP which has been described with reference to FIGS. 9A to 9C in at least a partial period. That is, the active period AT in which active data is written may correspond to the display scan period DSP included in one frame period in which the data signal is written and the vertical blank period VB may overlap at least a part of the self-scan period SSP included in one frame period. Here, as described with reference to FIG. 1, in order to improve the mura phenomenon caused by the parking voltage Vpark supplied in the vertical blank period VB, the display apparatus 1000 according to exemplary embodiments of the present disclosure may control the supply frequency of the fourth scan signal SC4*i* to be changed in every frame period in a second mode in which the supply frequency of the second scan signal SC2*i* exceeds a reference frequency.

In this case, in the first frame period, the fourth scan signal SC4*i* is supplied at the maximum frequency (for example, 240 Hz) so that the fourth scan signal SC4*i* may be supplied in the self-scan periods SSP included in the first frame period. That is, the self-scan periods SSP included in the first frame period may be driven as a second driving period DP2 which has been described with reference to FIG. 5.

In contrast, in the second frame period after the first frame period, the fourth scan signal SC4*i* may be supplied at the same frequency as the supply frequency of the second scan signal SC2*i* for writing the data signal. Accordingly, in the self-scan periods SSP included in the second frame period, the fourth scan signal SC4*i* is not supplied so that the self-scan periods SSP included in the second frame period may be driven as the third driving period DP3 which has been described with reference to FIG. 6 (or the third driving period DP3_1 which has been described with reference to FIG. 7).

This will be described in more detail below with reference to FIGS. 11 and 12.

Figure 11:
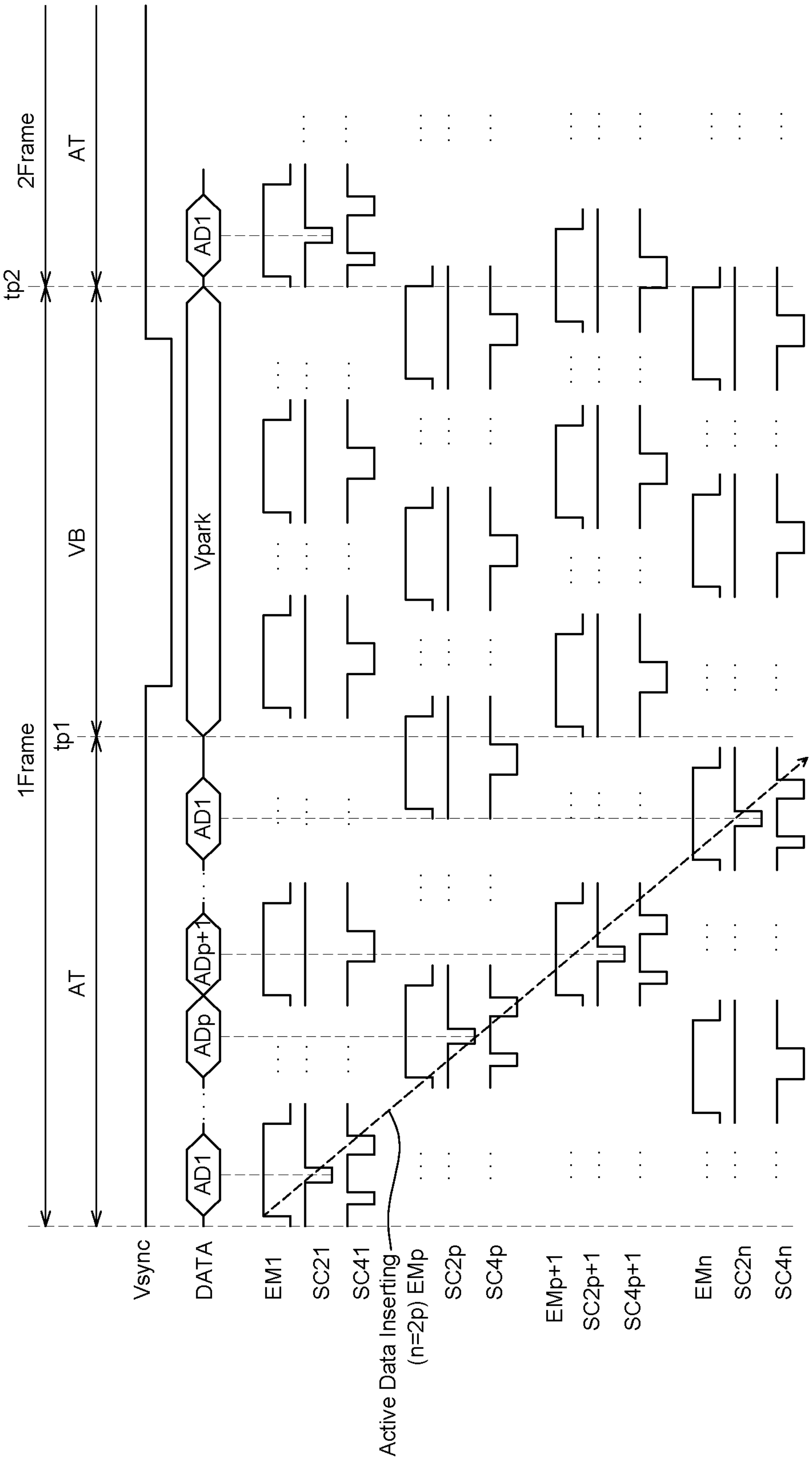
FIG. 11 is a waveform for explaining an example of driving of the display apparatus of FIG. 1 in a first mode according to exemplary embodiments of the present disclosure.

FIG. 11 is a waveform for explaining an example of driving of the display apparatus of FIG. 1 in a first mode according to one embodiment.

Figure 12:
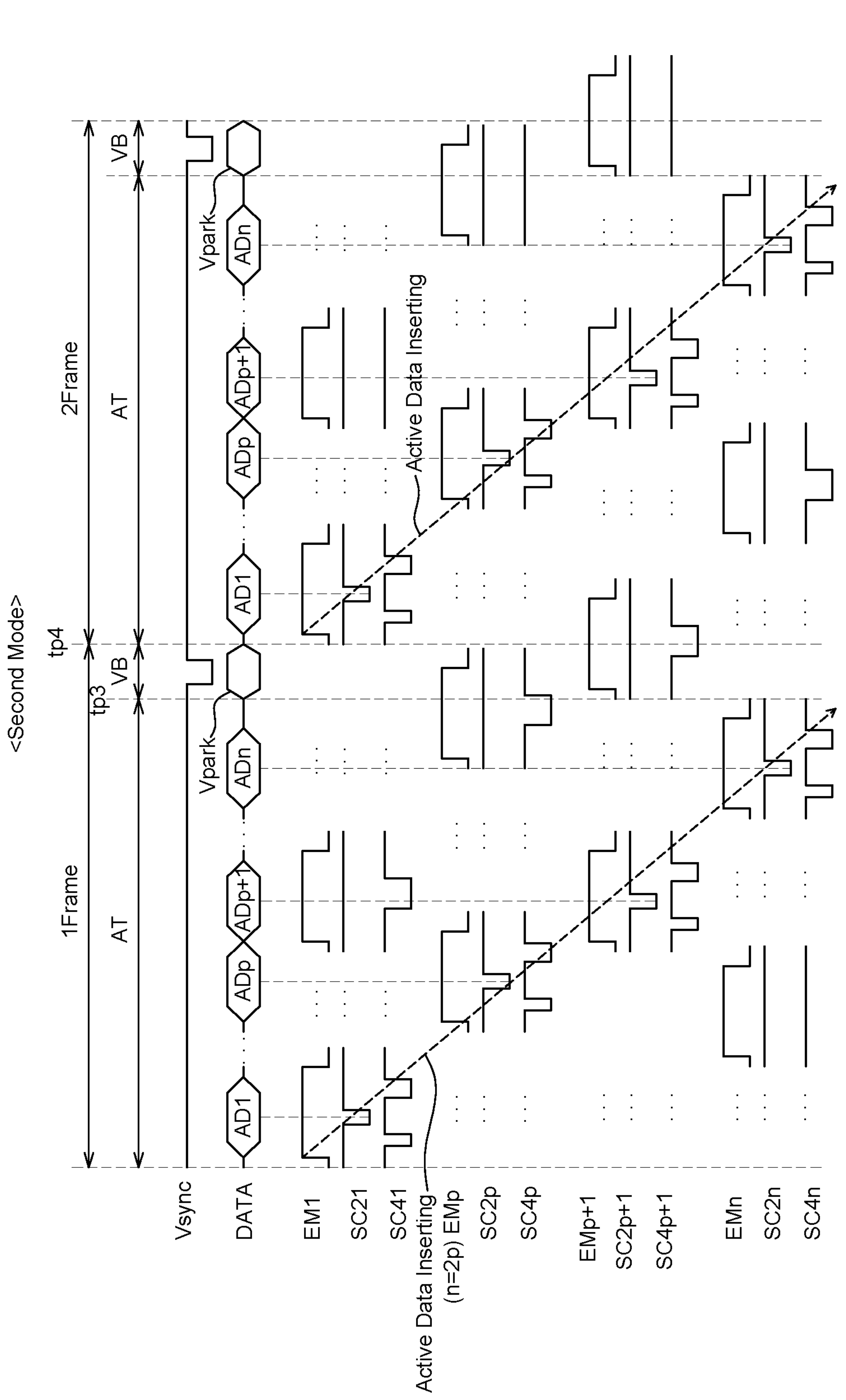
FIG. 12 is a waveform for explaining an example of driving of the display apparatus of FIG. 1 in a second mode according to exemplary embodiments of the present disclosure.

FIG. 12 is a waveform for explaining an example of driving of the display apparatus of FIG. 1 in a second mode according to one embodiment.

Figure 13:
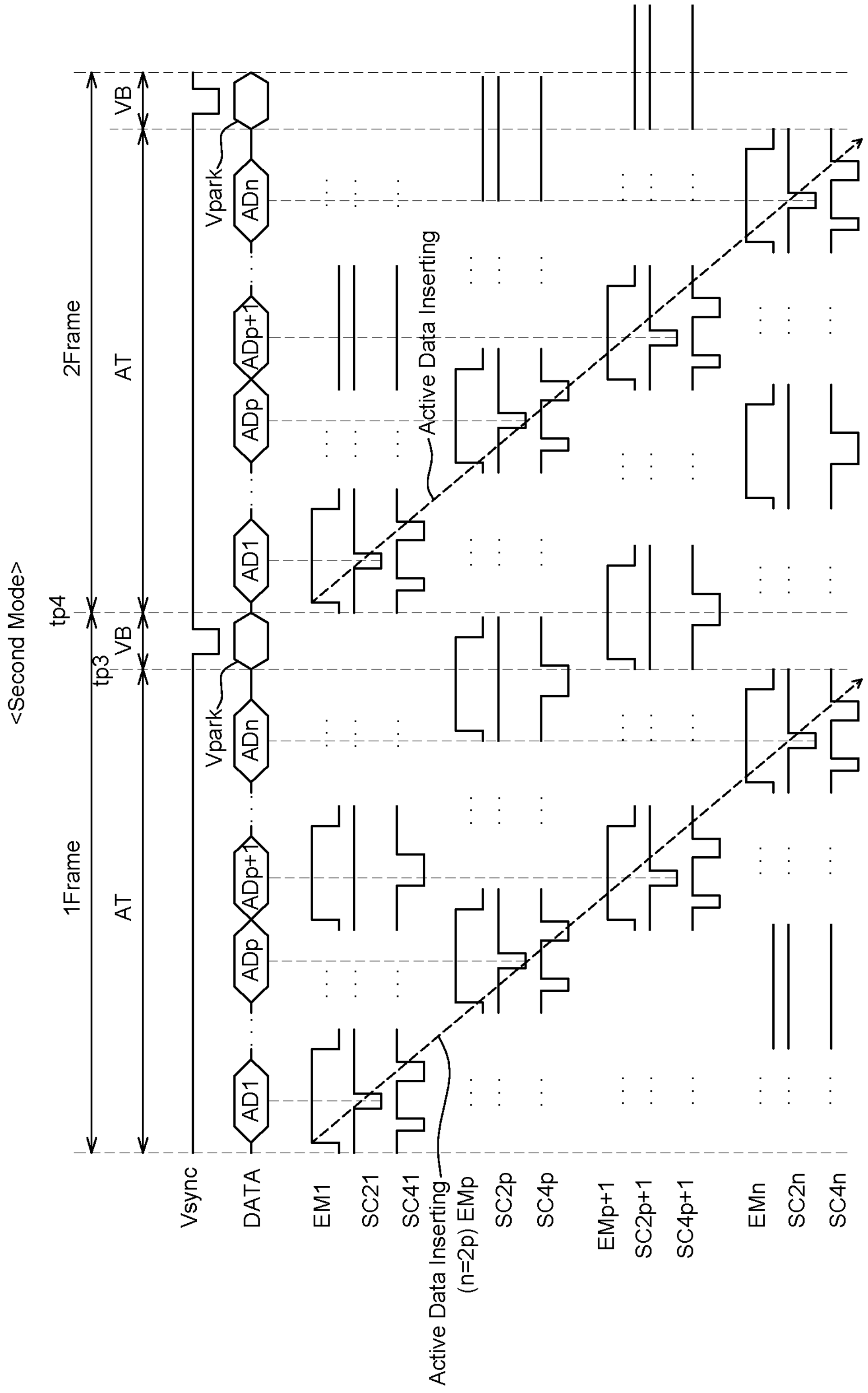
FIG. 13 is a waveform for explaining another example of driving of the display apparatus of FIG. 1 in a second mode according to exemplary embodiments of the present disclosure.

FIG. 13 is a waveform for explaining another example of driving of the display apparatus of FIG. 1 in a second mode according to one embodiment.

In the meantime, in FIG. 11, an example of signals for driving the display apparatus 1000 when the display apparatus 1000 is driven at a frame frequency which is equal to or lower than a reference frequency (for example, 60 Hz) (for example, a supply frequency of the second scan signal SC2*i* is equal to or lower than the reference frequency) is illustrated. In FIGS. 12 and 13, an example of signals for driving the display apparatus 1000 when the display apparatus 1000 is driven at a frame frequency which exceeds a reference frequency (for example, 60 Hz) (for example, a supply frequency of the second scan signal SC2*i* exceeds the reference frequency) is illustrated.

In the meantime, for the convenience of description, in FIGS. 11 to 13, a vertical synchronization signal Vsync, a data signal DATA, emission signals EM1 to EMn, second scan signals SC21 to SC2*n*, and fourth scan signals SC41 to SC4*n* are illustrated.

In the meantime, for the convenience of description, in FIGS. 11 to 13, only emission signals EM1, EMp, EMp+1, and EMn, second scan signals SC21, SC2*p*, SC2*p*+1, SCn, and fourth scan signals SC41, SC4*p*, SC4*p*+1, and SC4*n* supplied in response to a first horizontal line, a p-th (p is an integer larger than 0 and n=2p) horizontal line, a p+1-th horizontal line, and an n-th horizontal line among horizontal lines are illustrated.

In order to avoid redundant description, in FIGS. 11 to 13, contents which do not overlap the description with reference to FIGS. 1 to 10 will be mainly described. A part which is not specifically described follows the above-described exemplary embodiment and the same reference numeral denotes the same component and the like reference numeral denotes the like component.

Referring to FIGS. 1, 3, 4, 5, 6, 9A to 9C, 10, and 11, in the first mode, the display apparatus 1000 may be driven at a frame frequency (for example, 60 Hz) which is equal to or lower than the reference frequency (for example, 60 Hz). That is, each of the second scan signals SC21, SC2*p*, SC2*p*+1, and SC2*n* is supplied at the same frequency as the frame frequency of the display apparatus 1000 so that the supply frequency of the second scan signals SC21, SC2*p*, SC2*p*+1, and SC2*n* may be equal to or lower than the reference frequency (for example, 60 Hz).

In the meantime, as described with reference to FIG. 10, active data AD1, ADp, ADp+1, and ADn may be supplied as a data signals DATA in synchronization with a timing when the second scan signals SC21, SC2*p*, SC2*p*+1, and SC2*n* are supplied (in FIG. 11, illustrated by "Active Data inserting").

In the meantime, one frame period may include an active period AT and the vertical blank period VB. For example, each of a first frame period 1Frame and a second frame period 2Frame may include an active period AT and a vertical blank period VB.

As described with reference to FIGS. 1 to 10, in the vertical blank period VB of each of the first frame period 1Frame and the second frame period 2Frame, a data signal DATA of the parking voltage Vpark may be supplied to the data lines D1 to Dm.

That is, a voltage level of the data lines D1 to Dm may vary at a first time tp1 which is a starting point of the vertical blank period VB and a second time tp2 which is an end point. For example, a voltage level corresponding to the active data is changed to a voltage level corresponding to the parking voltage Vpark or a voltage level corresponding to the parking voltage Vpark is changed to a voltage level corresponding to the active data.

Here, in the first mode, the display apparatus 1000 is driven at a frame frequency which is less than or equal to the reference frequency so that the length of the vertical blank period VB may be relatively long. That is, an interval between the first time tp1 and the second time tp2 may be relatively wide. In this case, after the voltage level of the data signal DATA which is supplied to the data lines D1 to Dm is changed at the first time tp1, the voltage level of the data signal DATA supplied to the data lines D1 to Dm is changed at the second time tp2 after a relatively long time has passed. Therefore, the mura phenomenon may not be visible to the actual user. That is, even though the scan signals (for example, fourth scan signals SC41, SC4*p*, SC4*p*+1, and SC4*n*) are supplied at the first time tp1 at which the voltage level of the data signal DATA supplied to the data lines D1 to Dm varies so that the mura phenomenon is generated between the first time tp1 and the second time tp2, the interval between the first time tp1 and the second time tp2 is relatively wide. Therefore, even though the mura phenomenon is generated at the first time tp1 and the second time tp2, the interval between the times when the mura phenomenon is generated is relatively wide so that the mura phenomenon may not be visible to the actual user.

For example, referring to FIG. 11, in the first mode, the fourth scan signals SC41, SC4*p*, SC4*p*+1, and SC4*n* may be supplied at a timing when the second scan signals SC21, SC2*p*, SC2*p*+1, and SC2*n* are supplied. The fourth scan signals SC41, SC4*p*, SC4*p*+1, and SC4*n* may be supplied as high level signals at a timing when the active data ADp is supplied and may be supplied as low level signals at a timing when the active data ADp+1 is supplied.

Accordingly, the display apparatus 1000 may control the supply frequency of the fourth scan signals SC41, SC4*p*, SC4*p*+1, and SC4*n* to be maintained at the maximum frequency (for example, 240 Hz) regardless of the frame periods 1Frame and 2Frame in the first mode in which it is driven at a frame frequency equal to or lower than the reference frequency. Accordingly, in the low-frequency driving which is equal to or lower than the reference frequency, the panel refresh is normally performed so that the hysteresis characteristic is improved to normally suppress the flickering phenomenon in the low-frequency driving. Further, in the low-frequency driving which is equal to or lower than the reference frequency, the mura phenomenon is not visible to the user.

Next, referring to FIGS. 1, 3, 4, 5, 6, 9A to 9C, 10, and 12, in the second mode, the display apparatus 1000 may be driven at a frame frequency (for example, 120 Hz) which exceeds the reference frequency (for example, 60 Hz). That is, each of the second scan signals SC21, SC2*p*, SC2*p*+1, and SC2*n* is supplied at the same frequency as the frame frequency of the display apparatus 1000 so that the supply frequency of the second scan signals SC21, SC2*p*, SC2*p*+1, and SC2*n* may exceed the reference frequency (for example, 120 Hz).

In the meantime, as described with reference to FIG. 10, active data AD1, ADp, ADp+1, and ADn may be supplied as a data signal DATA in synchronization with a timing when the second scan signals SC21, SC2*p*, SC2*p*+1, and SC2*n* are supplied (in FIG. 12, illustrated by "Active Data inserting").

In the meantime, one frame period may include an active period AT and the vertical blank period VB. For example, each of a first frame period 1Frame and a second frame period 2Frame may include an active period AT and the vertical blank period VB.

As described with reference to FIGS. 1 to 10, in the vertical blank period VB of each of the first frame period 1Frame and the second frame period 2Frame, a data signal DATA of the parking voltage Vpark may be supplied to the data lines D1 to Dm.

That is, a voltage level of the data lines D1 to Dm may vary at a third time tp3 which is a starting point of the vertical blank period VB and a fourth time tp4 which is an end point. For example, a voltage level corresponding to the active data is changed to a voltage level corresponding to the parking voltage Vpark or a voltage level corresponding to the parking voltage Vpark is changed to a voltage level corresponding to the active data.

Here, in the second mode, the display apparatus 1000 is driven at a frame frequency which exceeds the reference frequency so that the length of the vertical blank period VB may be relatively short. That is, an interval between the third time tp3 and the fourth time tp4 may be relatively narrow. In this case, after the voltage level of the data signal DATA which is supplied to the data lines D1 to Dm is changed at the third time tp3, the voltage level of the data signal DATA supplied to the data lines D1 to Dm is changed at the fourth time tp4 in a relatively short time. Therefore, the mura phenomenon may be generated at the third time tp3 and the fourth time tp4. For example, fourth scan signals (for example, fourth scan signals SC4*p* and SC4*p*+1 corresponding to p-th and p+1-th horizontal lines) are supplied at the third time tp3 and the fourth time tp4 so that the mura phenomenon may be generated at the third time tp3 and the fourth time tp4.

Accordingly, the display apparatus 1000 according to the exemplary embodiments of the present disclosure may control the supply frequency of the fourth scan signals SC41, SC4*p*, SC4*p*+1, and SC4*n* in one frame period, for example, a second frame period 2Frame which is a subsequent frame period of the first frame period 1Frame. For example, the display apparatus 1000 may control the supply frequency of the fourth scan signals SC41, SC4*p*, SC4*p*+1, and SC4*n* in the second frame period 2Frame to be equal to the frame frequency (or the supply frequency of the second scan signals SC21, SC2*p*, SC2*p*+1, and SC2*n*) of the display apparatus 1000.

In this case, as illustrated in FIG. 12, in response to the vertical blank period VB of the second frame period 2Frame, the signal level of the fourth scan signals (for example, the fourth scan signals SC4*p* and SC4*p*+1 corresponding to p-th and p+1-th horizontal lines) is not shifted, but is maintained at a gate-off level (that is, the transistors are not turned on). Accordingly, the mura phenomenon is not generated in the second frame period 2Frame. For example, the fourth scan signal SC41 may be supplied as a high signal at a timing when the active data ADp+1 is supplied in the second frame period 2Frame. Therefore, the fourth scan signal SC4*p*+1 is supplied as a high signal in the vertical blank period VB of the second frame period 2Frame so that the eighth transistor T8 may be maintained to be turned off so that the mura phenomenon is not generated in the second frame period 2Frame.

As descried above, the display apparatus 1000 controls the supply frequency of the fourth scan signals SC41, SC4*p*, SC4*p*+1, and SC4*n* to be different from each other in every frame period 1Frame and 2Frame in the second mode in which it is driven at a frame frequency which exceeds the reference frequency. Accordingly, in the high-frequency driving which exceeds the reference frequency, a frame period in which the panel refresh is performed and the frame period in which the mura phenomenon is suppressed are repeatedly performed so that not only the hysteresis characteristic is improved, but also the mura phenomenon is suppressed so as not to be visible to the user in the high-frequency driving.

In the meantime, in FIG. 12, it is illustrated that the emission control signals EM1, EMp, EMp+1, and EMn are supplied at a maximum frequency (for example, 120 Hz) regardless of the frame frequency (supply frequency of the second scan signals SC21, SC2*p*, SC2*p*+1, and SC2*n*) of the display apparatus 1000. However, it is just illustrative, but the exemplary embodiment of the present disclosure is not limited thereto.

For example, further referring to FIG. 13, as described with reference to FIG. 7, the supply frequency of the emission control signals EM1, EMp, EMp+1, and EMn may be also controlled to be equal to the supply frequency of the fourth scan signals SC41, SC4*p*, SC4*p*+1, and SC4*n*. For example, in the second mode, the supply frequency of the emission control signals EM1, EMp, EMp+1, and EMn may be controlled to a maximum frequency during the first frame period 1Frame and may be controlled to be equal to the frame frequency (or the supply frequency of the second scan signals SC21, SC2*p*, SC2*p*+1, and SC2*n*) of the display apparatus 1000 during the second frame period 2Frame.

As described above, in the pixel circuit according to exemplary embodiments of the present disclosure and the display apparatus including the same, a supply frequency of a fourth scan signal which is supplied to the pixel circuit may be controlled, in response to a frame frequency (or a supply frequency of a second scan signal) of the display apparatus. For example, in a first mode in which the frame frequency (or a supply frequency of a second scan signal) of the display apparatus is equal to or lower than the reference frequency, a supply frequency of a fourth scan signal is maintained at a maximum frequency regardless of a frame period. In a second mode in which the frame frequency (or the supply frequency of the second scan signal) of the display apparatus exceeds the reference frequency, the supply frequency of the fourth scan signal may vary in every frame period. Accordingly, the pixel circuit according to the exemplary embodiments of the present disclosure and the display apparatus including the same may be driven at various frame frequencies and suppress the mura phenomenon which may be visible to the user.

The exemplary embodiments of the present disclosure can also be described as follows:

A pixel circuit according to an exemplary embodiment of the present disclosure includes a light emitting diode, a first transistor which is connected between a first node and a third node and controls a driving current flowing from a first power line which supplies a first power voltage to a second power line which supplies a second power voltage through the light emitting diode, a second transistor which is connected between the third node and a second node corresponding to a gate electrode of the first transistor and is turned on in response to a first scan signal supplied to a first scan line, a third transistor which is connected between a data line and the first node and is turned on in response to a second scan signal supplied to a second scan line, a fourth transistor which is connected between the second node and a third power line which supplies a third power voltage and is turned on in response to a third scan signal supplied to a third scan line, a fifth transistor which is connected between the first power line and the first node and is turned off in response to an emission control signal supplied to an emission control line, a sixth transistor which is connected between the third node and a fourth node corresponding to a first electrode of the light emitting diode and is turned off in response to the emission control signal, and a seventh transistor which is connected between the fourth node and a fourth power line which supplies a fourth power voltage and is turned on in response to a fourth scan signal supplied to a fourth scan line, wherein a supply frequency of the fourth scan signal is determined in response to a supply frequency of the second scan signal.

A first mode in which the supply frequency of the second scan signal is equal to or lower than a reference frequency, the supply frequency of the fourth scan signal may be constant for every frame period and in a second mode in which the supply frequency of the second scan signal exceeds the reference frequency, the supply frequency of the fourth scan signal may varies in every frame period.

In the second mode, the supply frequency of the fourth scan signal in a first frame period may be a maximum frequency and the supply frequency of the fourth scan signal in a second frame period after the first frame period may be equal to the supply frequency of the second scan signal.

The maximum frequency may be four times the reference frequency.

In the second mode, a supply frequency of the emission control signal in each of the first frame period and the second frame period may be the maximum frequency.

In the second mode, the supply frequency of the emission control signal in the first frame period may be the maximum frequency and the supply frequency of the emission control signal in the second frame period may be equal to the supply frequency of the second scan signal.

In the first mode, the supply frequency of the fourth scan signal may be constant as the maximum frequency in every frame period.

The reference frequency may be 60 Hz.

The pixel circuit may further include an eighth transistor which is connected between the first node and a fifth power line which supplies a fifth power voltage and is turned on in response to the fourth scan signal.

A display apparatus according to another exemplary embodiment of the present disclosure includes pixels each of which is connected to first to fourth scan lines, an emission control line, a data line, and first to fifth power lines to which first to fifth power voltages are supplied, a scan driver which supplies first to fourth scan signals to the first to fourth scan lines, respectively, an emission driver which supplies an emission control signal to the emission control line and a data driver which supplies a data signal to the data line, wherein each of the pixels includes a light emitting diode, a first transistor which is connected between a first node and a third node and controls a driving current flowing from the first power line to the second power line through the light emitting diode, a second transistor which is connected between the third node and a second node corresponding to a gate electrode of the first transistor and is turned on in response to the first scan signal, a third transistor which is connected between the data line and the first node and is turned on in response to the second scan signal, a fourth transistor which is connected between the second node and the third power line and is turned on in response to the third scan signal, a fifth transistor which is connected between the first power line and the first node and is turned off in response to the emission control signal, a sixth transistor which is connected between the third node and a fourth node corresponding to a first electrode of the light emitting diode and is turned off in response to the emission control signal, and a seventh transistor which is connected between the fourth node and the fourth power line and is turned on in response to the fourth scan signal, and wherein the scan driver determines a supply frequency of the fourth scan signal in response to a frame frequency or a supply frequency of the second scan signal of the display apparatus.

The scan driver controls the supply frequency of the fourth scan signal to be constant in every frame period in a first mode in which the frame frequency may be equal to or lower than a reference frequency and the supply frequency of the fourth scan signal varies in every frame period in a second mode in which the frame frequency exceeds the reference frequency.

In the second mode, the scan driver may control the supply frequency of the fourth scan signal in a first frame period to a maximum frequency and may control the supply frequency of the fourth scan signal in a second frame period after the first frame period to be equal to the supply frequency of the second scan signal.

The maximum frequency may be four times the reference frequency.

In the second mode, the emission driver may control a supply frequency of the emission control signal in each of the first frame period and the second frame period to be the maximum frequency.

In the second mode, the emission driver may control a supply frequency of the emission control signal in the first frame period to the maximum frequency and may control the supply frequency of the emission control signal in the second frame period to be equal to the supply frequency of the second scan signal.

In the first mode, the scan driver may control the supply frequency of the fourth scan signal in every frame period to be constant as the maximum frequency.

The reference frequency may be 60 Hz.

The pixel may further include an eighth transistor which is connected between the first node and the fifth power line and is turned on in response to the fourth scan signal.

One frame period may include an active period and a vertical blank period and the data driver supplies a parking voltage to the data line in response to the vertical blank period.

The parking voltage may be maintained to a constant voltage level.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit, comprising:

a light emitting diode;

a first transistor that is connected between a first node and a third node, the first transistor configured to control a driving current flowing from a first power line that supplies a first power voltage to a second power line that supplies a second power voltage through the light emitting diode;

a second transistor that is connected between the third node and a second node corresponding to a gate electrode of the first transistor, the second transistor configured to be turned on in response to a first scan signal supplied to a first scan line;

a third transistor that is connected between a data line and the first node, the third transistor configured to be turned on in response to a second scan signal supplied to a second scan line;

a fourth transistor that is connected between the second node and a third power line that supplies a third power voltage, the fourth transistor configured to be turned on in response to a third scan signal supplied to a third scan line;

a fifth transistor that is connected between the first power line and the first node, the fifth transistor configured to be turned off in response to an emission control signal supplied to an emission control line;

a sixth transistor that is connected between the third node and a fourth node corresponding to a first electrode of the light emitting diode, the sixth transistor configured to be turned off in response to the emission control signal; and a seventh transistor that is connected between the fourth node and a fourth power line that supplies a fourth power voltage, the seventh transistor configured to be turned on in response to a fourth scan signal supplied to a fourth scan line, wherein a supply frequency of the fourth scan signal is determined in response to a supply frequency of the second scan signal.

2. The pixel circuit according to claim 1, wherein in a first mode in which the supply frequency of the second scan signal is equal to or less than a reference frequency, the supply frequency of the fourth scan signal is constant for every frame period, and in a second mode in which the supply frequency of the second scan signal exceeds the reference frequency, the supply frequency of the fourth scan signal varies in every frame period.

3. The pixel circuit according to claim 2, wherein in the second mode, the supply frequency of the fourth scan signal in a first frame period is a maximum frequency and the supply frequency of the fourth scan signal in a second frame period that is after the first frame period is equal to the supply frequency of the second scan signal.

4. The pixel circuit according to claim 3, wherein the maximum frequency is four times the reference frequency.

5. The pixel circuit according to claim 3, wherein in the second mode, a supply frequency of the emission control signal in each of the first frame period and the second frame period is the maximum frequency.

6. The pixel circuit according to claim 3, wherein in the second mode, a supply frequency of the emission control signal in the first frame period is the maximum frequency and the supply frequency of the emission control signal in the second frame period is equal to the supply frequency of the second scan signal.

7. The pixel circuit according to claim 3, wherein in the first mode, the supply frequency of the fourth scan signal is constant as the maximum frequency in every frame period.

8. The pixel circuit according to claim 2, wherein the reference frequency is 60 Hz.

9. The pixel circuit according to claim 1, further comprising:

an eighth transistor that is connected between the first node and a fifth power line that supplies a fifth power voltage, the eighth transistor configured to be turned on in response to the fourth scan signal.

10. The pixel circuit according to claim 9, wherein the second transistor is configured to be turned on before the eighth transistor.

11. A display apparatus, comprising:

pixels each of which is connected to a first scan line, a second scan line, a third scan line, a fourth scan line, an emission control line, a data line, a first power line that supplies a first power voltage, a second power line that supplies a second power voltage, a third power line that supplies a third power voltage, a fourth power line that supplies a fourth power voltage, and a fifth power line that supplies a fifth power voltage;

a scan driver configured to supply a first scan signal to a first scan line, a second scan signal to a second scan line, a third scan signal to a third scan line, and a fourth scan signal to a fourth scan line;

an emission driver configured to supply an emission control signal to the emission control line; and a data driver configured to supply a data signal to the data line, wherein each of the pixels includes:

a light emitting diode;

a first transistor that is connected between a first node and a third node, the first transistor configured to control a driving current flowing from the first power line to the second power line through the light emitting diode;

a second transistor that is connected between the third node and a second node corresponding to a gate electrode of the first transistor, the second transistor configured to be turned on in response to the first scan signal;

a third transistor that is connected between the data line and the first node, the third transistor configured to be turned on in response to the second scan signal;

a fourth transistor that is connected between the second node and the third power line, the fourth transistor configured to be turned on in response to the third scan signal;

a fifth transistor that is connected between the first power line and the first node, the fifth transistor configured to be turned off in response to the emission control signal;

a sixth transistor that is connected between the third node and a fourth node corresponding to a first electrode of the light emitting diode, the sixth transistor configured to be turned off in response to the emission control signal; and a seventh transistor that is connected between the fourth node and the fourth power line, the seventh transistor configured to be turned on in response to the fourth scan signal, and wherein the scan driver configured to determine a supply frequency of the fourth scan signal in response to a frame frequency or a supply frequency of the second scan signal of the display apparatus, wherein the scan driver is configured to control the supply frequency of the fourth scan signal to be constant in every frame period in a first mode in which the frame frequency is equal to or less than a reference frequency, and the supply frequency of the fourth scan signal varies in every frame period in a second mode in which the frame frequency exceeds the reference frequency.

12. The display apparatus according to claim 11, wherein in the second mode, the scan driver is configured to control the supply frequency of the fourth scan signal in a first frame period to a maximum frequency and is configured to control the supply frequency of the fourth scan signal in a second frame period after the first frame period to be equal to the supply frequency of the second scan signal.

13. The display apparatus according to claim 12, wherein the maximum frequency is four times the reference frequency.

14. The display apparatus according to claim 12, wherein in the second mode, the emission driver is configured to control a supply frequency of the emission control signal in each of the first frame period and the second frame period to be the maximum frequency.

15. The display apparatus according to claim 12, wherein in the second mode, the emission driver is configured to control a supply frequency of the emission control signal in the first frame period to the maximum frequency and controls the supply frequency of the emission control signal in the second frame period to be equal to the supply frequency of the second scan signal.

16. The display apparatus according to claim 11, wherein in the first mode, the scan driver is configured to control the supply frequency of the fourth scan signal in every frame period to be constant as a maximum frequency.

17. The display apparatus according to claim 11, wherein the reference frequency is 60 Hz.

18. The display apparatus according to claim 11, wherein each of the pixels further includes an eighth transistor that is connected between the first node and the fifth power line, the eighth transistor configured to be turned on in response to the fourth scan signal.

19. The display apparatus according to claim 18, wherein the second transistor is configured to be turned on before the eighth transistor.

20. The display apparatus according to claim 11, wherein one frame period includes an active period and a vertical blank period and the data driver configured to supply a parking voltage to the data line in response to the vertical blank period.

21. The display apparatus according to claim 20, wherein the parking voltage is maintained to a constant voltage level.

* * * * *